US010233642B2

(12) United States Patent
McKenzie

(10) Patent No.: US 10,233,642 B2
(45) Date of Patent: Mar. 19, 2019

(54) BUILDINGS

(71) Applicant: SUPERPOD PTY. LTD, Melbourne, Victoria (AU)

(72) Inventor: Fiona McKenzie, Melbourne (AU)

(73) Assignee: SUPERPOD PTY. LTD, Melbourne (AU)

( * ) Notice: Subject to any disclaimer, the term of this patent is extended or adjusted under 35 U.S.C. 154(b) by 7 days.

(21) Appl. No.: 15/316,989

(22) PCT Filed: Jun. 10, 2015

(86) PCT No.: PCT/AU2015/050319
§ 371 (c)(1),
(2) Date: Dec. 7, 2016

(87) PCT Pub. No.: WO2015/188229
PCT Pub. Date: Dec. 17, 2015

(65) Prior Publication Data
US 2017/0114540 A1    Apr. 27, 2017

(30) Foreign Application Priority Data

Jun. 10, 2014  (AU) .............................. 2014902202
Oct. 10, 2014  (AU) .............................. 2014904058

(51) Int. Cl.
*E04C 2/292* (2006.01)
*E04B 1/24* (2006.01)
(Continued)

(52) U.S. Cl.
CPC ................ *E04C 2/292* (2013.01); *E04B 1/24* (2013.01); *E04B 1/762* (2013.01); *E04B 1/80* (2013.01);
(Continued)

(58) Field of Classification Search
CPC .......... E04B 1/762; E04B 1/3483; E04B 1/24; E04B 1/80; E04B 2/58; E04B 1/18;
(Continued)

(56) References Cited

U.S. PATENT DOCUMENTS 4,435,928 A    3/1984  Huling
5,678,369 A *  10/1997 Ishikawa ................... B32B 3/02
                                                        52/309.7

(Continued)

FOREIGN PATENT DOCUMENTS

GB      1399935 A      7/1975
WO   2011144941 A2   11/2011

*Primary Examiner* — Adriana Figueroa
*Assistant Examiner* — Jessie T Fonseca
(74) *Attorney, Agent, or Firm* — Nadya Reingand; Yan Hankin

(57) ABSTRACT

A building comprising a structural frame of the building, at least one window or door supported by and substantially aligned to the frame, and an external wall formed by at least one insulated sandwich panel, the panel(s) in the external wall being supported by the frame and being offset externally from the frame, wherein the frame is exposed in at least part of the interior of the finished building and wherein at least part of the internal wiring of the building traverses the interior of the building on and/or in the frame.

12 Claims, 26 Drawing Sheets

(51) Int. Cl.
  *E04B 1/76*   (2006.01)
  *E04B 1/80*   (2006.01)
  *E04B 2/58*   (2006.01)

(52) U.S. Cl.
  CPC ........ *E04B 2/58* (2013.01); *E04B 2001/2481* (2013.01)

(58) Field of Classification Search
  CPC ... E04B 1/348; E04B 1/02; E04B 1/74; E04C 2/34; E04C 2/292
  See application file for complete search history.

(56) References Cited

U.S. PATENT DOCUMENTS

| | | | |
|---|---|---|---|
| 5,953,883 | A | 9/1999 | Ojala |
| 8,607,531 | B2 * | 12/2013 | Schiffmann ........... B29C 70/086 52/270 |
| 2002/0189182 | A1 * | 12/2002 | Record ................... E04C 2/292 52/309.9 |
| 2008/0066422 | A1 | 3/2008 | Huxel |
| 2011/0036030 | A1 * | 2/2011 | Hegland ................... E04B 1/26 52/309.4 |
| 2014/0102024 | A1 * | 4/2014 | Schiffmann ............... E04B 2/56 52/293.1 |
| 2015/0275509 | A1 * | 10/2015 | Ciuperca ................... E04B 1/80 52/745.09 |

\* cited by examiner

BUILDINGS

CROSS-REFERENCE TO RELATED APPLICATIONS

The present application is a National stage application from PCT application PCT/AU2015/050319, filed Jun. 10, 2015, which claims priority to Australian patent applications AU 2014902202 filed Jun. 10, 2014 and AU 2014904058 filed Oct. 10, 2014, all of which incorporated herein by reference.

FIELD OF INVENTION

In the quest for sustainable, affordable, quick buildings, particularly housing, an increasingly urgent issue in Australia and world-wide, prefabricated sandwich panels are being used as parts of the walls and roofs of occupiable buildings.

SUMMARY

A sandwich panel is a building panel with two skins and a continuous insulation layer, usually hard foam, sandwiched in between the skins. The skins may be prefinished e.g. for an external wall; the skin may be pre-painted steel or other material which is waterproof and suitable for an exposed wall. Usually the sandwich panel is not finished on both sides but will require cladding or lining (which may require further framing), plastering, rendering, painting, and the like on one or both sides.

Sandwich panels are beneficial because they save time in construction and provide continuous insulation. This is in contrast to traditional methods of construction, which are more time consuming as they typically require the erection of a frame, stud walls, interior lining, exterior skin, with manually placed insulation. Traditional methods of insulation are deficient because the insulation is not continuous but is in broken sections, being manually placed between parts of a frame.

Sandwich panels may be either structural or non-structural. Structural sandwich panels are those that do not require a separate structural frame, as they are structurally self-supporting up to a point, and able to withstand certain loads placed on them.

One problem with the use of sandwich panels in construction is the need to hide necessary wiring and other services including electrical conduit, wires, cabling for electrical or internet or computer or fax or satellite TV or phone connections, gas or possibly plumbing (wiring). This leads to extra cost and time in design, construction, retrofitting and maintenance. That is, the need to hide wiring makes the building more complex and potentially less affordable in the short and long term.

Non-structural sandwich panels need a structural frame for support and are not generally strong enough to contain wiring or services inside the panel. To cut room for wiring into the non-structural panel itself would affect the insulating performance and potentially the structural integrity of the panel, could damage the skins, and would be messy and impractical. Therefore wiring needs to be laid on top of the skin of the panel facing the interior of the building, and then be covered up by an internal layer, e.g. plaster and paint, to hide the wiring. The internal layer usually needs to be attached to the structural frame (usually with extra framing required to support the internal layer). The internal layer also covers up any internal structural or supporting frame in the traditional way because frames are not usually designed to be exposed, including the extra—usually messy—stud wall framing required to support the internal layer.

The extra internal layer, together with the extra framing requirement, adds cost and time to the build. This defeats the aim of sandwich panels saving on cost and time of construction. In addition, painted plaster finishes require regular repainting, a maintenance cost which is ongoing for the life of the building.

With structural panels, there may be no separate frame, and the wiring must be fed through a pre-cut channel in the panel otherwise there needs again to be a separate internal layer e.g. plaster and paint, including supporting stud frame for the plaster, to hide the wiring (which produces the same problems as with non-structural sandwich panels). While wiring can be fed internally through the panel, this method is not optimum during construction or post-construction. Hidden panel wiring has the following problems:

a. the continuous insulation barrier is compromised;
b. the wiring method must be carefully pre-planned (design time and cost; inflexible);
c. the wiring method is fiddly, requires particular skill, and can require more time by an electrician to fit;
d. the wiring must either be pre-installed in a factory, or if done on site while the panels are being laid it is time consuming and more expensive for the electrician to wire during construction;
e. it is hard if not impossible to retrofit further wiring into the panels;
e. if wiring requires fixing, amending or other work at any stage after construction, the whole wall of the house may need to be removed at great expense and thereby exposing the house to the elements.

Thermal bridging occurs when highly conductive or non-insulating materials come into contact with other materials or space, allowing heat to flow through the path of least thermal resistance created. This typically occurs when gaps or framing parts form a break in the insulation, forming a bridge between the interior space and exterior environment through which unwanted heat losses and gains can occur.

In addition, a thermal bridge contributes to poor building performance by creating a junction which is poorly insulated and which attracts condensation and mould.

Where sandwich panels are used in construction, thermal bridges can be created if the sandwich panels are faced with steel or other metal which traverses from the inside to the outside of a building envelope, formed from such sandwich panels. There is therefore a problem in using steel-faced sandwich panels for buildings where energy efficiency is desired, and sandwich panels may be avoided for that reason, despite their other benefits in building construction.

Where components of a building envelope join or connect, they can form a joint. At such a joint, a creation of a gap in the building envelope may be formed, through which gap, air and vapour may travel. Air and vapour gaps are detrimental to the building's performance because they create an inefficient building envelope, in that conditioned air escapes through the building envelope, and unconditioned air enters the building in an uncontrolled fashion, and vapour transfer is uncontrolled. This is inefficient because the energy used to condition the air or control moisture content is wasted if air and vapour enter and exit the building without control.

If the building utilises steel and some other hard or dense materials in the framing or building envelope, the problems of air and vapour movement can be worse than if non-steel or softer materials are used, because hard materials may be difficult to connect together, and because steel flexes or expands and contracts as the temperatures and moisture content in the surrounding air vary.

Traditional forms of providing a building envelope which is airtight and vapour proof tend to use membranes to provide an airtight barrier; tape over all critical junctions such as wall to floor, wall to roof, wall to wall, window and door connections; and a sealant like butyl seal. These methods are typically used in passive houses (as specified by the International Passive House institute's Standard). These materials are then hidden from view by the traditional application of plaster walls over the top of the airtightness materials. The methods of achieving airtightness and vapour proof barriers are visible and messy and do not make the building visibly suitable for occupation, and are required to be hidden by an extra internal lining such as plaster.

These methods of providing an airtight and vapour proof building envelope do not work for steel connections, because membranes, sealant and tape can be too rigid to account for expansion, contraction and flexing of the metal and joints as temperature and humidity fluctuate. Further, where the panel skins are steel or other material which is airtight and waterproof, membranes and tape do not exploit those properties and are unnecessarily cumbersome. Nor do they work unless the membrane and tape is able to be covered up or hidden by a material such as plaster.

In any event, achieving airtightness, even in a conventional building, by using these traditional methods of airtightness such as membrane, tape and sealant, is typically difficult. One reason for the problem with achieving airtightness in a conventional building is that the layers of the building are complex, and perforations in the building envelope continue throughout the build process for services such as electrical and plumbing.

Airtightness of a building may be tested by use of a "blower door test" so that the rate of leakage of air from the building is measured. In conventional buildings a blower door test may need to be performed up to three times, as the construction processes can create holes or air gaps while the layers of services to the building are added. That is, the building may be airtight at an early stage, but may become leaky as the building process continues.

Therefore, the use of metal components in a building, including steel framing components and sandwich panels with metal skins, may also be avoided due to the inherent issues of air-tightness when considering design and construction of an energy efficient building.

It is therefore desirable for preferred embodiments of the present invention to at least in part obviate some of the issues discussed above or provide an alternative solution.

According to a first aspect of the present invention, there is provided a building comprising a structural frame of the building, at least one window or door supported by and substantially aligned to the frame, and an external wall formed by at least one insulated sandwich panel, the panel(s) in the external wall being supported by the frame and being offset externally from the frame, wherein the frame is exposed in at least part of the interior of the finished building and wherein at least part of the internal wiring of the building traverses the interior of the building on and/or in the frame.

Other services, such as gas or plumbing may also traverse the building's interior. Therefore, the use of an internal wall or layer consisting of plaster and paint to hide the wiring or services is not required, which greatly reduces the time and potential cost in construction. Further, fixing or amending the wiring or services after construction is also easier, faster and cheaper.

Preferably, the external wall can comprise sealing means at a junction or space between sandwich panels or between sandwich panels and other building components such as windows, doors, roof, floor and frame so as to substantially reduce or eliminate the flow of heat through that junction or space. More preferably, the external wall further comprises sealing means at a junction or space between sandwich panels or between sandwich panels and other building components such as windows, doors, roof, floor and frame so as to substantially reduce or eliminate the flow of air through that junction or space. The sealing means can be an insulated, waterproof or airtight component. The building can comprise an entry point for services or wiring located in a junction or space between sandwich panels or between sandwich panels and other building components such as windows, doors, roof, floor and frame. The entry point can be located between the sealing means and the junction or space so as to substantially reduce or eliminate the flow of air through the entry point. The wiring or services can traverse within the interior of the frame, from the entry point to an access point or between access points, the access points being within the interior of the building.

Advantageously, this building provides the incorporation of hidden and safe wiring or other services in passages or conduits, such as tubes or pipes on or inside the frame, i.e. electrical conduit, wires, cabling for electrical or internet or computer or fax or satellite TV or phone connections, gas or possibly plumbing conduits, so that the building can be designed and constructed easily, quickly and potentially cheaply, while retaining the simplicity and insulation value of the insulated panels Preferably, the structural frame is pre-finished. More preferably, at least one insulated sandwich panel is pre-finished.

The building can further comprise a subfloor structure for supporting the building; the structural frame further comprising a plurality of frame members including supporting posts, beams, joists and connections to the subfloor structure including slab or stump footings; and a plurality of insulated sandwich panels and insulating materials, wherein the frame is connected to the subfloor structure at one or more support junctions and the plurality of insulated sandwich panels and insulating materials are fixed externally of the frame, such that the insulated sandwich panels or insulating materials extend past the support junction or junctions such that substantially the entirety of the frame is insulated from the external environment and thermally separated from any parts of the frame or support junctions outside the insulation layer Preferably, any part of the frame otherwise exposed to the exterior is provided with additional insulation material so as to substantially reduce or eliminate the flow of heat through that part of the frame. The structural frame can be substantially made of metal.

A surface of the at least one panel may be formed of metal.

According to an example of the present invention, there is provided a building comprising: a structural frame of the building, an external wall comprising at least one insulated sandwich panel fixed to and supported by the frame, a surface of the at least one panel being of metal, wherein the at least one panel is arranged externally from the frame.

A portion of that surface (being made of metal) can adjoin another component of the building, wherein the portion comprises at least one channel so configured that the at least one channel breaks thermal conduction along said portion of the panel in a direction transverse to the at least one channel.

Preferably, the portion comprises two adjacent generally parallel channels. These features also have applicability to other forms of building construction using insulated sandwich panels.

Accordingly, another example of the present invention provides a building comprising: a structural frame of the building; an external wall comprising at least one insulated sandwich panel fixed to and supported by the frame, a surface of the at least one panel being of metal and a portion of that surface adjoining another component of the building; and wherein the portion comprises at least one channel so configured that the at least one channel breaks thermal conduction along said portion of the panel in a direction transverse to the at least one channel.

Preferably, said portion comprises two adjacent generally parallel channels.

The channel(s) provides breaks in the thermal conduction along a portion of the surface of the panel where a thermal bridge can occur such as where steel or other metal faced insulating sandwich panels run continuously from the interior to the exterior of the insulated building envelope whether through walls or roof or floor, and thereby such break(s) reduce heat losses and gains from a joint between the panel and another component of the building, while producing minimal disruption to the structural strength of the panel.

Preferably, the at least one channel is provided wherever the metal faced panel runs from the interior to the exterior of the insulated building envelope. The at least one channel can be positioned on a surface of the panel so that it is covered by the insulation in any adjoining insulating layer such as any insulated sandwich panel. More preferably, the at least one channel is positioned between the interior surface of the insulating envelope and the exterior surface of the insulating envelope. The at least one channel can therefore be placed inside the insulating envelope of the building. This results in a more energy efficient building envelope by allowing the use of insulated sandwich panels in the building while minimising or avoiding any thermal bridges potentially caused by the use of such panel, and thereby maximising the benefits of a metal faced sandwich panel.

Software programs are available that can model thermal conduction in components of a building and further calculate thermal bridge values. When two narrow channels, each on the order of 2 to 4 mm wide, adjacent and generally parallel to each other, were modelled as being located in the interior surface of a panel which connects the interior and exterior of a building, it was found surprisingly, that the calculated thermal bridge value was zero. In other words, there was no thermal conduction via that surface of the panel between the interior and exterior of the building. The software program therefore projects that the two channels very effectively provide a thermal break in portions of the metal surface of panels that can potentially act as thermal bridges between the interior and exterior of a building.

Sandwich panels, when faced with metal, have a structural integrity which can be compromised if the metal skin is removed. Therefore, breaking the thermal conduction by removing sections or channels of metal can result in the panel becoming weaker and potentially unusable, and can result in extra material being required to strengthen the panel where the metal has been removed. Removing the thermal bridge introduced by a metal faced sandwich panel may therefore be difficult to do without damaging or compromising the strength of the panel.

Preferably, each or at least one channel is between 1 mm and 12 mm in width. Where the portion of the surface of the panel comprises a single channel, the channel can have a width between 8 to 12 mm.

In the case where said portion comprises two or more channels, the channels may be narrower. More preferably, each or at least one channel is between 1 and 5 mm and therefore are of a width such that the channel or channels only marginally compromise the integrity or strength of the panel and therefore the joint between the portion of the panel and another component of the building or the channeled portion of the panel may not need strengthening. Alternatively, if strengthening is preferred, the joint may be strengthened as long as doing so does not introduce additional thermal bridges. The panel joint may be strengthened by providing support through external flashing in the eaves, in the case of a roof to wall joint; or the channeled portion of the panel may be strengthened by providing extra support for the panel through ties or strips of an insulating material such as PVC or even potentially a strong tape for suitable connection of metal panels. Two narrow channels are less invasive of the panels than one large channel, and it may therefore be easier to strengthen such a joint.

As a preferred embodiment, the spacing between the channels is in the range of 2 to 46 mm.

Preferably, the at least one panel is fixed or arranged external to the frame so that wiring can enter the building without piercing the at least one panel. The insulating and structural properties of the at least one panel are retained when the at least one insulated sandwich panel is not pierced. Having a building with an external wall formed of such panels where the insulation properties of the panels have not been compromised for the installation of wiring or services ensures that the external wall has correspondingly high insulating properties. Further, the surface of the panel is able to be retained as a finished wall surface.

The building can include at least one entry point for wiring and/or services. Said entry point can be contained through the floor or within an external surface of the exterior wall. The entry point can be adjacent to or in a joint or junction formed between or at a corner of two or more components such as: insulating sandwich panels, the frame and a panel, between the frame and the roof, between the frame and the floor, between the frame and a window and/or door, frame members, such as posts or beams. The entry point can be a hole in the frame, floor or roof or in or adjacent to a joint or junction of two or more components.

Preferably, the at least one window or door is attached to and is substantially aligned with the frame.

The external wall can be externally offset from the frame, windows and doors. Offsetting windows and doors from the external wall is a configuration that is usually avoided by the International Passive House Institute who typically stipulate that the plane of the insulation of the external walls should be aligned as much as possible with the windows. Indeed, such a configuration is considered likely to be non-compliant with the International Passive House Standard. However, staggering or offsetting the windows away from the building envelope has been found, upon testing, to be a configuration that is compliant with the International Passive House Standard.

The component of the building can be at least a part of the frame, window, door, floor or ceiling.

The building may also include internal walls, which may or may not be constructed from insulated sandwich panels.

Preferably, insulation around the frame, connections, edges and non-insulating materials is provided to continue the insulated exterior wall in gaps between insulated sandwich panels, between panels and windows, between panels and doors, and, where the external climate warrants, under the floor and between walls and floor.

Continuous insulation is a sustainability feature because it insulates the house/building from external variations in temperature, and reduces heating and cooling requirements or loads. This in turn reduces the amount of energy used to condition the internal temperatures of the building, and reduces the cost of energy use through investment in public and private infrastructure, the impact on the environment, and the cost to the homeowner or operator of heating and cooling a house/building. To take the most rigorous standard of insulation as an example, one turns to the Passive House design principles (that is, those promulgated by the International Passive House Institute led by Dr Wolfgang Feist and commenced with a pilot passive house in Darmstadt Germany in 1990).

In some embodiments, a sealing arrangement for making a substantially airtight junction between each window or door and its respective opening and other junctions where air or moisture may travel or leak is provided.

The exterior wall preferably includes one or more flashings or insulated, waterproof and airtight components covering respective junctions or spaces between sandwich panels and between sandwich panels and other elements including windows and frame, and said at least one entry point for services may located adjacent one of said junctions or spaces and located behind the flashing or such airtight component.

Advantageously, the building further includes foundations to which the frame is coupled at one or more support junctions, wherein the exterior wall and/or floor is sealed with the foundations at least partially along the junction therebetween.

The foundations may include a sub-floor structure upon which insulation and a sub-floor surface may be installed.

Preferably, the insulated sandwich panels extend down to overlap with any floor insulation, and in the case of multi-level buildings may continue past the floor in any upper floors to the floors below, providing continuous insulation in the walls. The panels may also extend down the outside of the foundations to a point below the support junctions. If the building is on stump footings, any insulation or insulated panels in or below the floor are preferably running horizontally in a continuous line above the footings, with minimal thermal bridging in connections between the structure inside the insulated envelope, and the footings.

The structural frame can further comprise supporting posts and beams and additional insulation material can be provided at connection points in the building such that no sections of the frame are exposed externally of the building and thermal bridging is obviated or minimised.

Preferably, the structural frame is connected to a subfloor structure, providing any structural, wind loading and other support needed for the walls, roof, windows and doors of the building. Further, insulation material can be provided around the frame, connections, edges and non-insulating materials such that the entirety of the frame and any other potential thermal bridges are insulated from the external environment, including the ground; such that the frame can be exposed internally, and the wiring and other services can be hidden.

Preferably, the structural frame is a pre-finished frame. The pre-finished frame can be clad with insulated sandwich panels that are at least internally pre-finished, such that the pre-finished frame is internal of the insulated sandwich panels; whereby wiring for the building can pass through or adjacent the internal pre-finished frame without interfering with the insulation in the sandwich panels, and additional insulation material can be provided at connection points in the building such that no sections of the frame are exposed externally of the building and thermal bridging is obviated or minimised.

Advantageously, most or all of any additional insulation material beyond the surface of the sandwich panels is not visible from the inside of the building.

Preferably, lighting is installed without piercing the panels by attaching the lighting to the frame or to fixed or movable arms attached to the frame or to cables hanging from the frame. This ensures that the insulation is continuous and also ensures that no air gaps are created by installing lighting fixtures, power points and switches. It also allows for wiring for lighting and power to be installed without the need for cavity walls or plaster.

Connections and gaps between elements of the building and between the interior and exterior of the building are preferably well sealed to prevent air and vapour entering or exiting the building.

The connections and joints of the building which are likely to constitute or create air gaps for air and vapour to leak out of or into the building can be made airtight first by use of a flexible expanding foam tape such as Compriband® or Hannoband® which is designed for use in connecting hard materials such as steel, or steel and concrete, or for connecting windows to frames or to other parts of the building. Junctions requiring use of the expanding foam tape are junctions where air could leak from the inside to outside of the building and include: where panels are joined or connected at 90 degree angles, where panels are joined to the floor or foundations; where a window or door frame is joined to the internal frame, or to the floor, and where a panel connects to the internal frame. It may also be beneficial to seal between panel joints using an expanding foam tape.

Membrane and tape is not effective as a primary method of achieving airtightness because the walls of preferred embodiments of the building do not require installation of plaster to be finished. Membrane and tape would require the installation of plaster or other form of paneling or finishing to cover them, which is an expense and time that preferred embodiments of the invention seek to avoid. In addition, the tape which is traditionally used for airtightness may not withstand movement in the components of the building, particularly steel components.

As an additional airtightness layer, tape or sealant such as butyl seal or caulking can also be applied, preferably where it is not visible to occupants of the building or from the outside. Preferably, the tape is an expanding foam tape. This may occur before insulation and flashing is installed around joints such as window or door connections, or corners of walls. If required, additional sealant or caulking may also be applied on the outside or inside of the building in joints, for example, in the joints between panels, or between floor and wall, or between windows and frame, or between frame and wall panels.

Further, where two or more components form a corner of the building, insulation infill in the form of foam panels or expanding foam can be provided to extend between the ends of these components, so as to insulate the corner and provide an airtightness layer. These components can comprise a part of the structural frame, subframe or foundations, including supporting posts, beams, footings, beams, as well as walls, panels, windows or doors. Additional caulking, sealing, membrane or flashing can be applied to add additional airtightness and/or waterproofing.

An air ventilation unit may be used to provide fresh air and control air temperatures and will be required if the building is airtight or substantially airtight.

According to a further example of the present invention, there is provided a sandwich panel for use in a building, the panel comprising at least one surface being of metal and a portion of that surface configured to adjoin another component of the building; and wherein the portion comprises at least one channel, and wherein the portion comprises at least one channel so configured that the channel breaks thermal conduction along said portion of the panel in a direction transverse to the channel. Preferably, said portion comprises two adjacent generally parallel channels.

It is advantageous that the positioning and sizing of window and door openings and sun shading measures are designed according to the Passive House Institute calculations in the Passive House Planning Package (PHPP) spreadsheet or another building physics modelling program.

It is advantageous that a predesigned system of building a building according to any one of the embodiments of the invention uses the PHPP or other building physics spreadsheet or program, to model the performance of a proposed building so as to flexibly respond to climate, orientation, size, shape or other relevant factors and adapt the design of the building by altering elements such as the thickness of panels, specification of glass or position and size of windows so that the building complies with Passive House principles.

The insulated sandwich panels are preferably non-structural. Non structural panels will enable multi-level buildings to be built more easily, and provide continuous insulation up the walls, while avoiding thermal bridges potentially introduced at each floor level.

The connection points in the building may be between the various frame, panels, windows, doors, floor and sub-floor elements.

The frame is preferably made from hollow section steel, and is advantageously suitably prefinished, such that the frame may remain internally exposed in the finished building. Alternatively, the frame can be made from timber. Preferred embodiments of the building system obviate or avoid thermal bridging, thus meeting high standards of continuous insulation and advantageously being able to meet Passive House requirements in that respect.

The wiring may run on top of or beneath the beams, or alternatively can be threaded through passages or conduits in the beams. A conduit can be positioned on top of, or below the beams to house the wires. Typically, at least one beam will be above head height, such that a person cannot easily see the top of the at least one beam. The wires may pass through the passages or conduits in the supporting posts. The supporting posts are preferably pre-cut with a series of holes, such that the wiring is extracted from the holes for connection to power points, switches, computer connections, lights etc. Holes may be provided in the floor, such that wires may be fed up through the floor. Wires may potentially be fed up through the open lower end of the supporting posts. When the frame is constructed, it is preferably pre-drilled with a series of holes at specified locations for wiring to traverse or be extracted. The beams and posts can be easily drilled on site to pull out wires at desired locations, although it is preferable for holes to be pre-cut when the frame is being prefabricated so that the frame may be painted or finished before delivery to site.

The insulated panels are preferably prefinished both internally and externally, such that additional layers are not required to finish the building. The outside layer is preferably coated steel, typically coated with a paint and/or zinc/aluminium alloy. The internal layer is preferably also coated steel, typically coated with paint and/or zinc/aluminium alloy. Between the inner and outer layer is an insulation material, most preferably a rigid thermoset plastic foam, such as closed cell polyisocyanurate, which is uninterrupted across the panels' width and height, providing continuous insulation. The panels are abutted against one another, such that thermal bridging is minimised or avoided, by keeping the frame completely internal to the building. The frame advantageously sits on top of the floor substructure or slab, with the wall panels forming a continuous insulation layer by overlapping with any floor insulation, sitting external of the floor or floor substructure or slab. Preferably, insulation or thermal break material with a high compressive strength such as Foamglas® or Tarecpir® can be attached between the frame, in particular the posts of the frame, and the substructure or slab. If the building is on stump footings, the floor substructure may consist of joists under which panels or, if floor insulation is not necessary, an airtight layer may be placed, enabling minimal thermal bridge connections to the footings below the floor insulation. If the joists are below the floor insulation, thermal breaks may be included between joists and the internal frame, such as Foamglas® or Tarecpir®.

The panels preferably extend downwards past the lowest point of any insulation in the floor, such as to insulate the frame and the whole interior of the building and prevent any thermal bridging.

The internal frame preferably provides support for the windows and/or doors, creating the frame into which the windows and/or doors sit. It is therefore advantageous that the windows align with the frame members, such that they sit atop the floor substructure or slab aligned with the edge of the slab, with the panels arranged external of the windows/doors and floor substructure or slab.

The insulated panels and additional insulation material around connections provide a continuous insulation layer around the window/door between building openings.

For multilevel buildings the panels may be laid to provide continuous insulation in the exterior walls past all levels of the building.

Insulated panels are also preferably used for the roof, again avoiding any thermal bridging, such that they sit atop the internal frame.

According to some embodiments, whilst extra layers may be added internally or externally as an option, there is no requirement to use these on all walls to hide wiring, as the wiring is integrated into and around the frame.

Additional insulation, preferably in the form of insulating foam panels or expanding foam, is used to insulate any gaps on the panel edges, any exposed frame, and the outside corners of the building and any window or door edges. Additional flashing and edging may be used to waterproof and finish the building and improve the appearance. This insulation, edging and flashing can be easily moved or removed for alteration or maintenance of the windows/door or to provide access for additional retrofit wiring through the corners of the building. The exposed areas can then be easily re-insulated and the flashing reinstalled.

According to some embodiments, solid insulating pieces or material with low thermal conductivity may be added to the exterior of the window frame or structural frame, while avoiding thermal bridging, to provide structural support for external shading devices and frames.

Connections and gaps between elements of the building and between the interior and exterior of the building may be well sealed to prevent air and vapour entering or exiting the building. Preferably, the material used for sealing the building will not be visible from the interior of the building and will not require plaster or other material to hide it.

According to one embodiment, the outside edges of the frame and edges of the floor or sub-floor will be effectively wrapped with a suitable material such as a flexible strip or tape, or applied flexible sealant, for sealing the interior of the building. Some of that material may be installed before the panels are installed. Some of that material may be installed after the panels are installed and before and after windows and doors are installed, so that all potential air and vapour gaps are sealed.

In smaller buildings the frame is preferably comprised of a series of 'pods' or 'pod frames' which are joined together to create a larger building. Additional 'pods' or parts of the building can be added at a later stage if an extension of the original building is desired.

Each of the pods may be separated by a corridor, insulation panels or other materials may be used as internal walls between pods, whereby the corridors provide acoustic buffering between pods.

Advantageously, there is an internal beam that can be positioned at a set height across all framing systems. It is preferable that this beam is used to integrate the wiring. This beam is preferably at approximately 2.4 m from floor level. Alternatively, the beam can be at less than 2.4 m from the floor.

The height of a beam at 2.4 m from floor level is consistent with the standard height of room lining panels, such as plywood or plaster, thus minimising cutting time and labour, and reducing waste from such panels.

Advantageously, the electrical lighting system may be connected to the wiring running in, along or on beams and posts without piercing the panels. According to some embodiments, the lighting includes any combination of tubular lighting on or under or beside the beams, or beside the posts, pendant or hanging lights attached to holes in the beams or cables hanging from holes in the beams, and lights attached to fixed or movable arms attached to the beams or posts.

According to some embodiments, airtightness and vapour barriers are applied and a heat recovery unit or air ventilation unit is installed so as to maximise building energy efficiency and to enable the International Passive House Standard to be met.

According to some embodiments, sun shading is provided so as to avoid or minimise overheating on hot days, including by external framing methods, so as to enable the Passive House Standard to be met without creating thermal bridges.

The building can be a Passive House building and wherein the interior of the building is substantially airtight and thermally isolated from the exterior.

BRIEF DESCRIPTION OF DRAWINGS

In order that the present invention can be more readily understood, preferred embodiments thereof will now be described, by way of non-limiting example only, with reference to the accompanying drawings, in which.

DETAILED DESCRIPTION OF THE PREFERRED EMBODIMENTS

Figure 1:
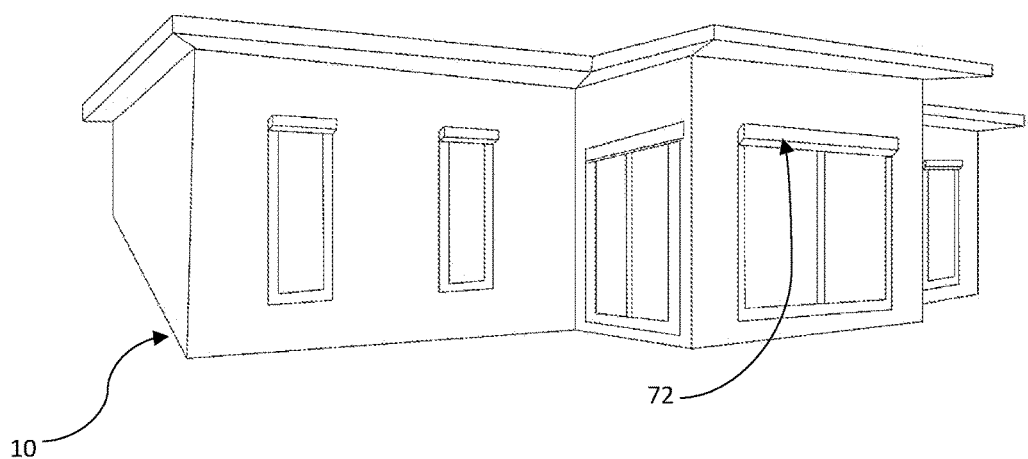
FIG. 1 is a perspective view of the outside of a building constructed according to a preferred embodiment of the present invention.
Figure 11:
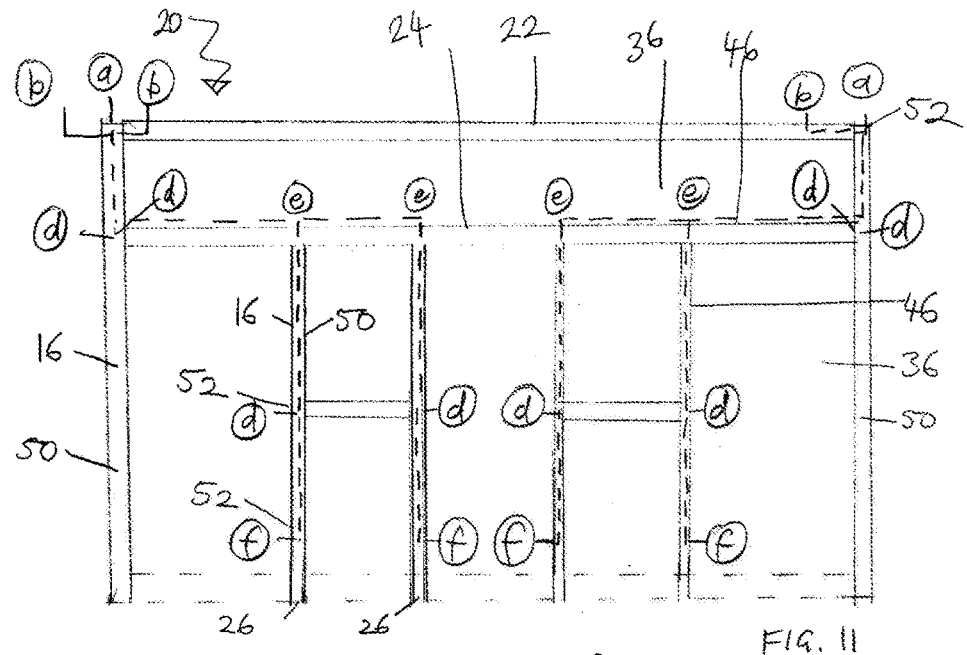
FIG. 11 is a front view of a frame with wiring according to one embodiment.
Figure 12:
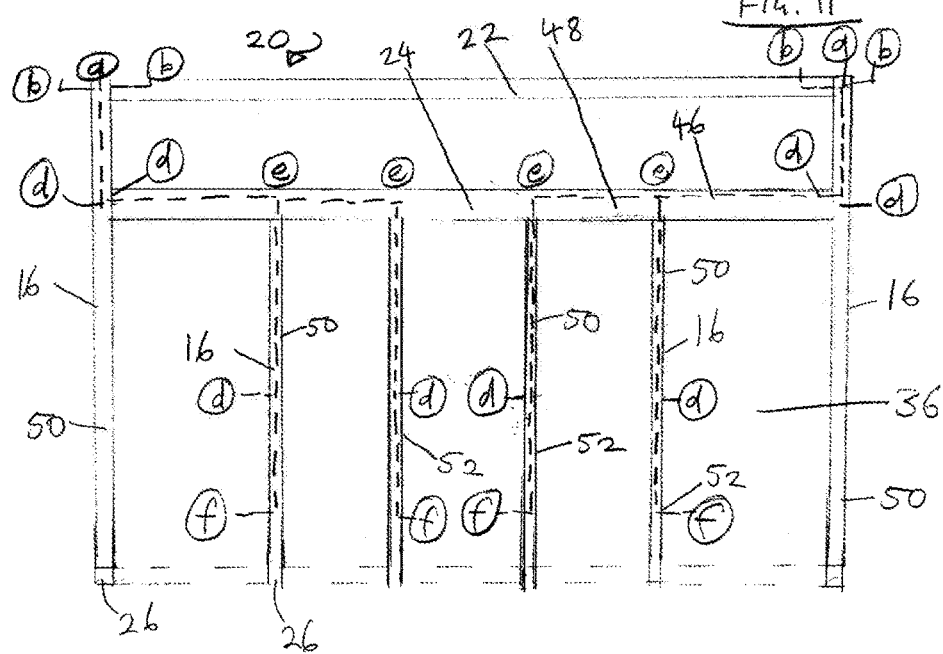
FIG. 12 is a front view of a frame with wiring according to another preferred embodiment.
Figure 13:
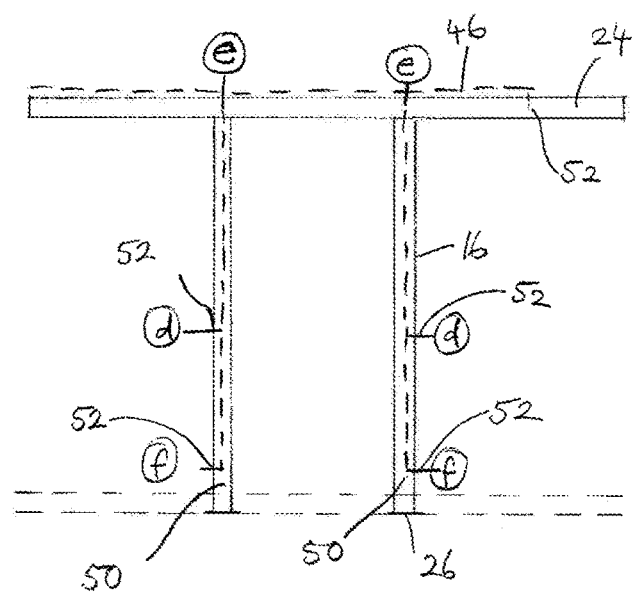
FIG. 13 is a front view of a frame with wiring according to a further preferred embodiment.

Referring now to FIGS. 1 to 18B, there is provided views of a preferred embodiment of the present invention. A view of a building 10 is shown in FIG. 1. The building 10 is constructed by creating foundations or subfloor structure, such as concrete slab 12, which matches the internal dimensions of the building 10. The supporting posts 16 of the frame 18 are located on the subfloor, and include footings 17 for connection to the subfloor structure, for example by bolts or welding to subplates (not shown). A frame 18 is constructed either by connecting posts and beams on site, or by using a series of prefabricated frame sections 20 (see FIGS. 11, 12 and 13), which include supporting posts 16 with beams 22, 24. When a prefabricated frame is erected, the vertical frame sections 20 are attached on top of the slab 12, aligned with the edge 28 of the slab, creating a support junction 29.

Figure 2:
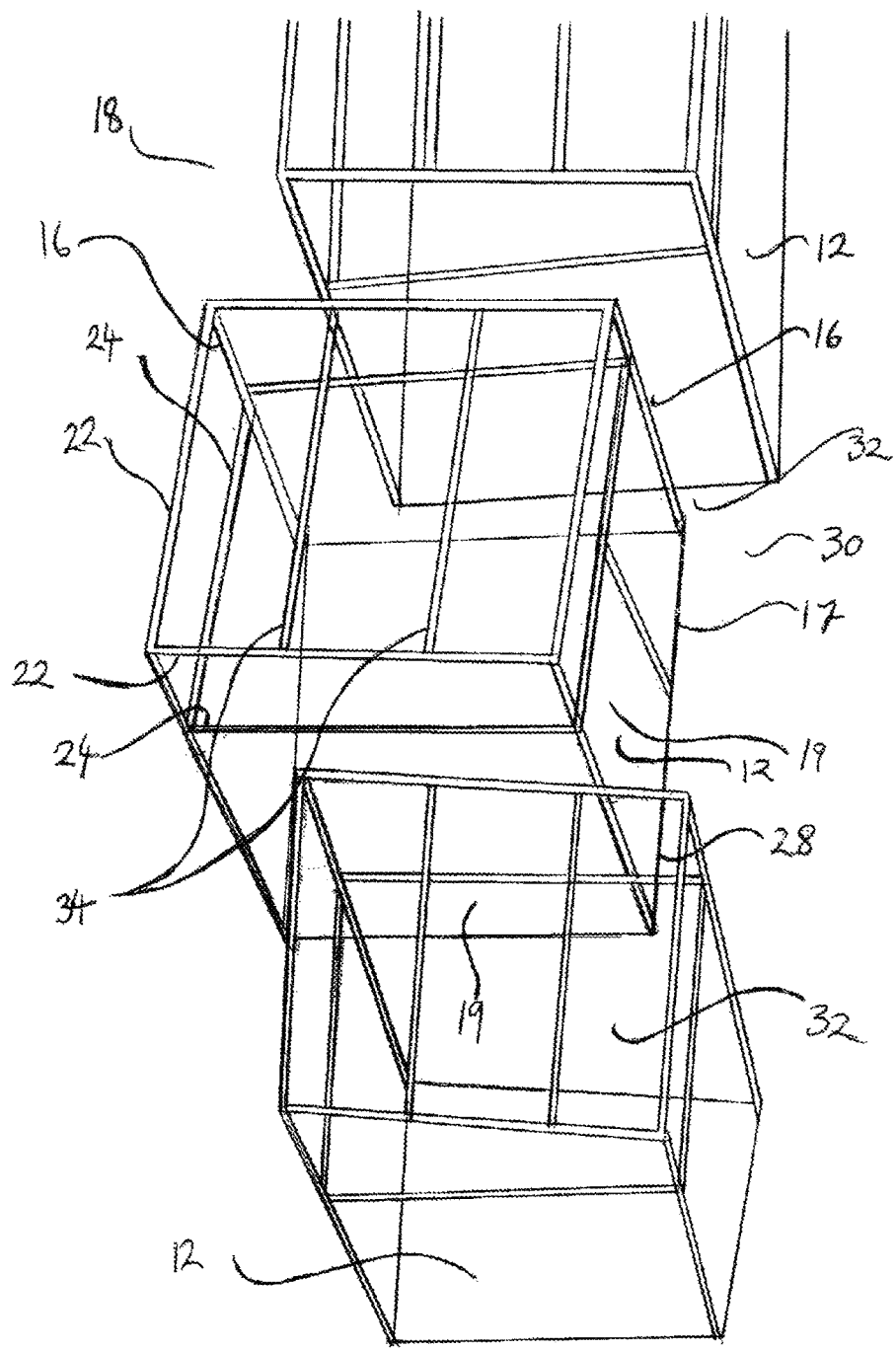
FIG. 2 is a perspective top view of a frame.
Figure 14:
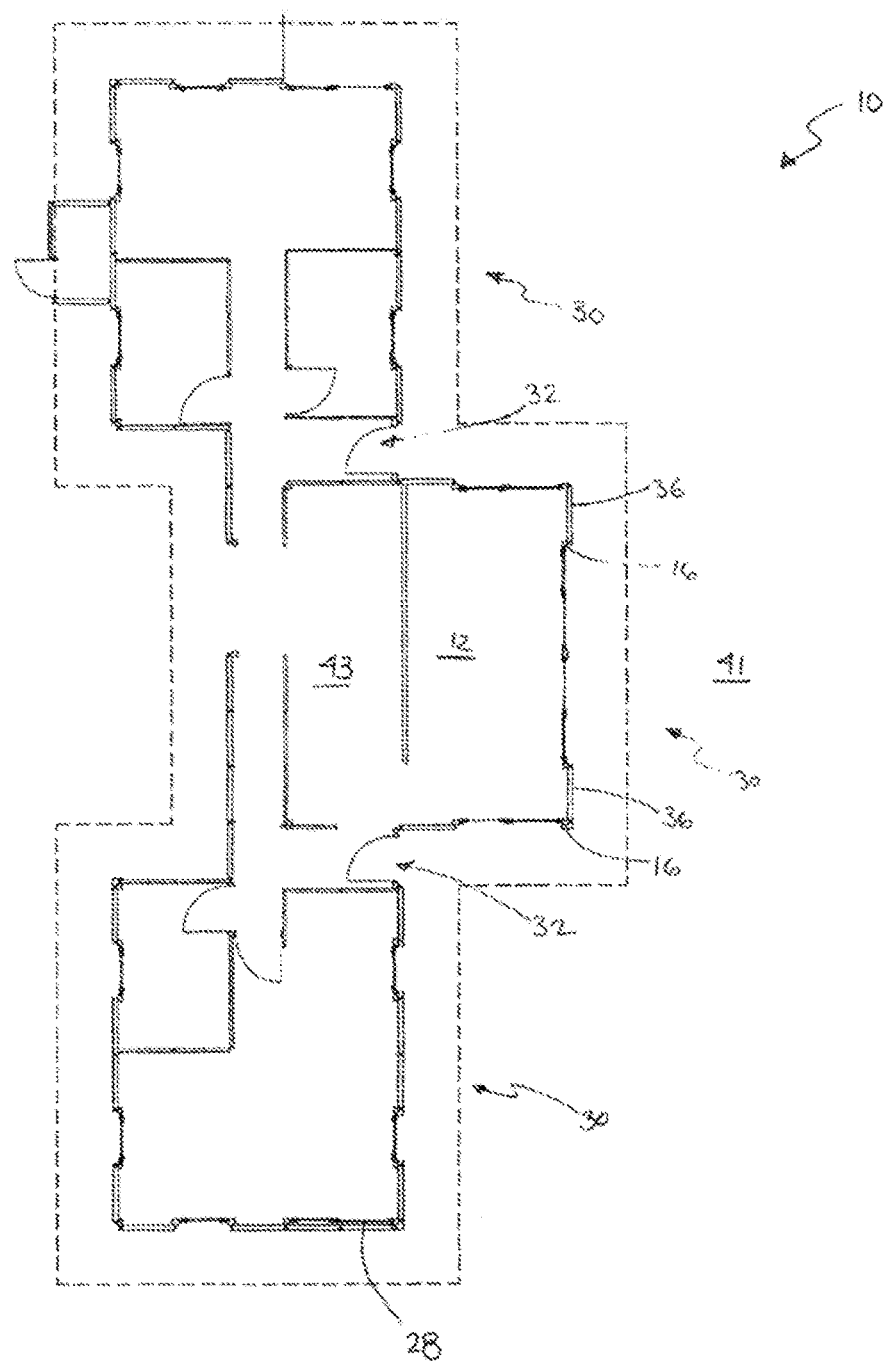
FIG. 14 is a plan view of a building constructed using a pod-frame according to a preferred embodiment of the present invention.
Figure 15:
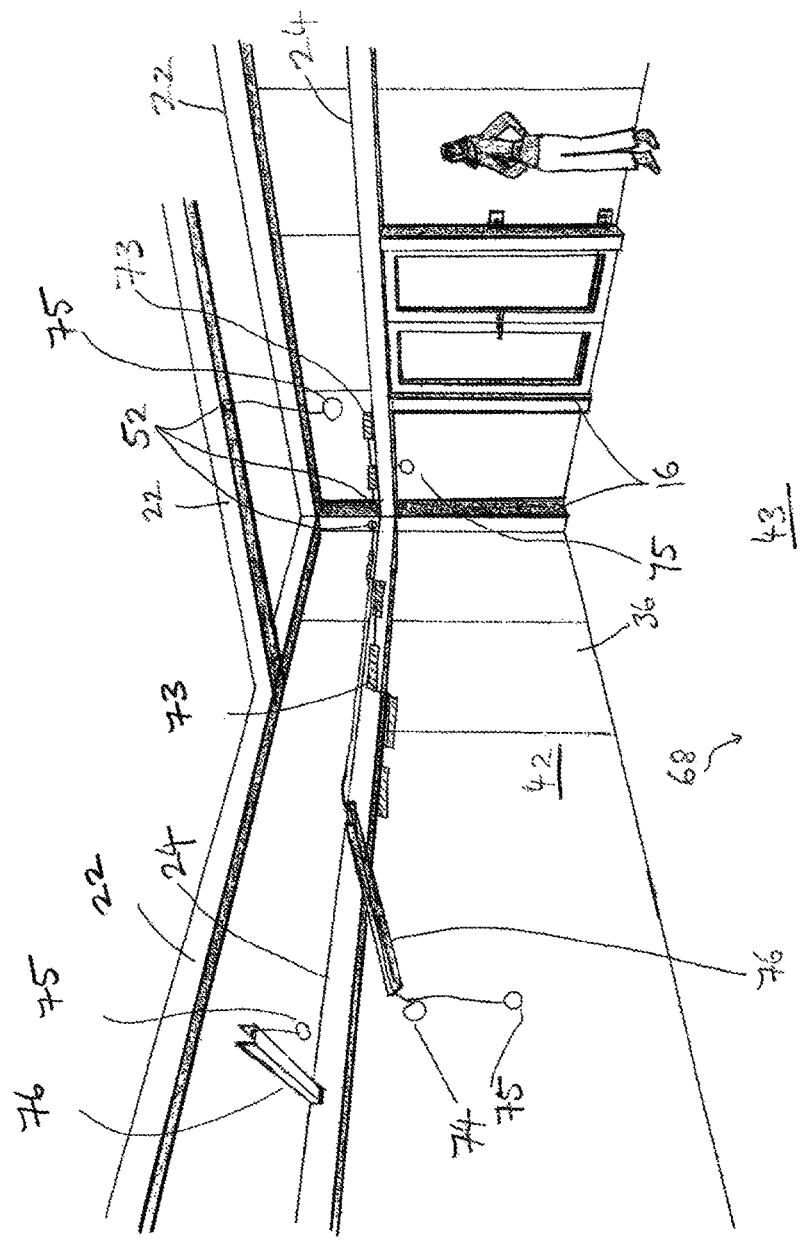
FIG. 15 is an internal view of a corner of a building constructed with electrical wiring and lighting according to a further embodiment.
Figure 16:
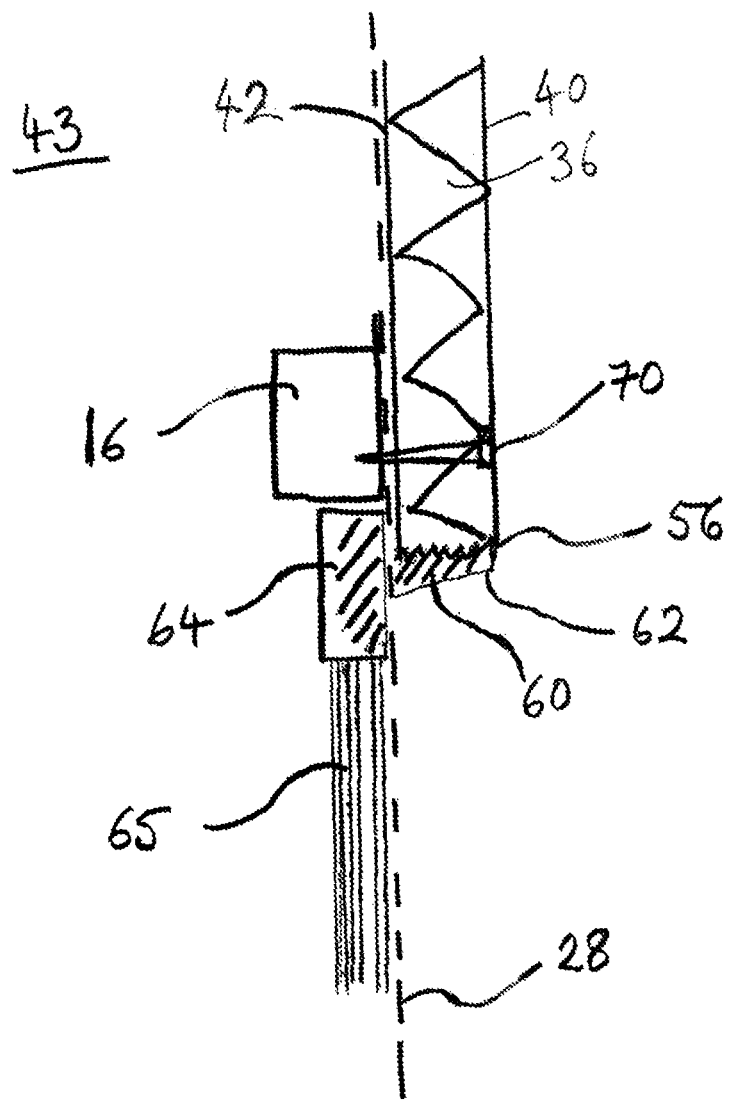
FIG. 16 is another cross-sectional top view of the side of the window according to another embodiment.
Figure 17:
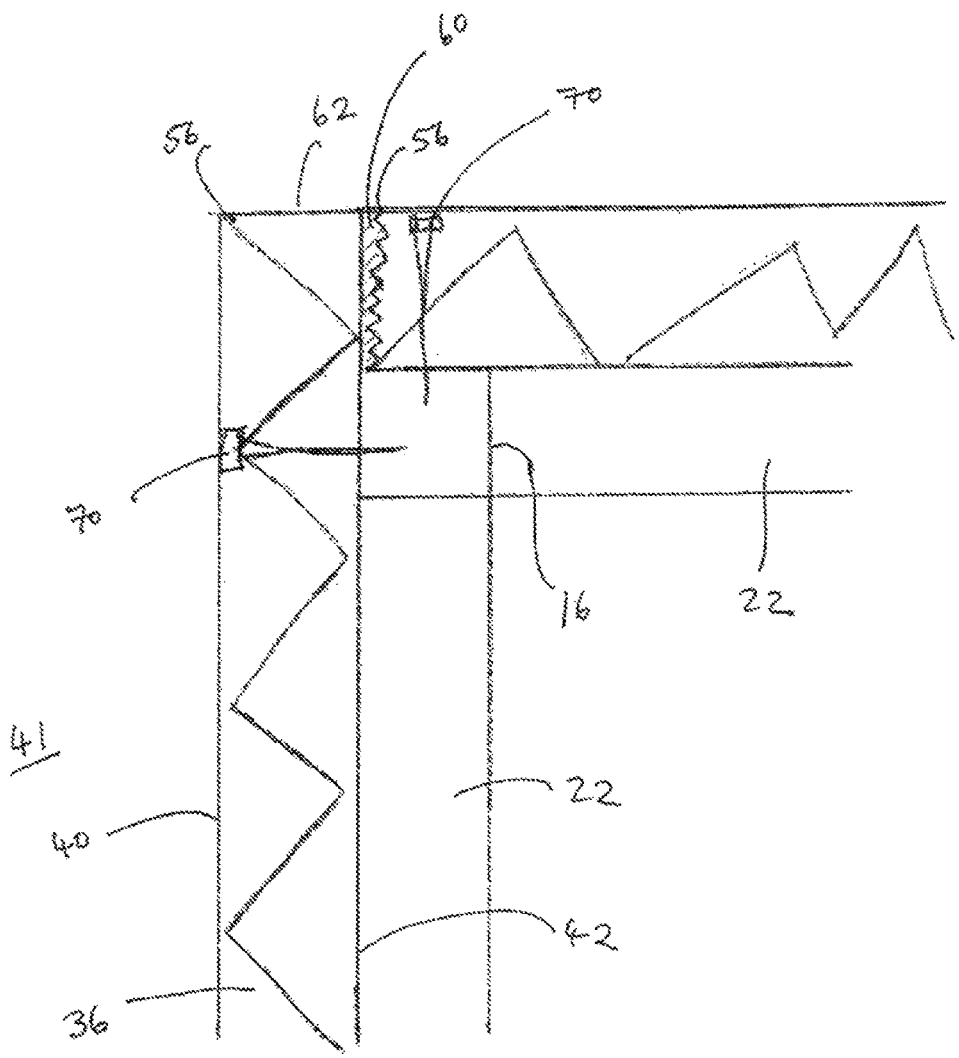
FIG. 17 is another cross-sectional top view of the corner of a building according to another embodiment.

The building 10 includes a series of standard frame sections 20, to create repeatable pods 30. As shown in FIGS. 2 and 14, this building 10 is constructed from three pods 30, each separated from the next by a corridor 32. Once the vertical frame sections 20 are positioned, internal roof beams 34, or a prefabricated roof frame sections 20, are connected between vertical frame sections 20. The vertical frame sections 20 include openings 19 for doors and/or windows.

Figure 4:
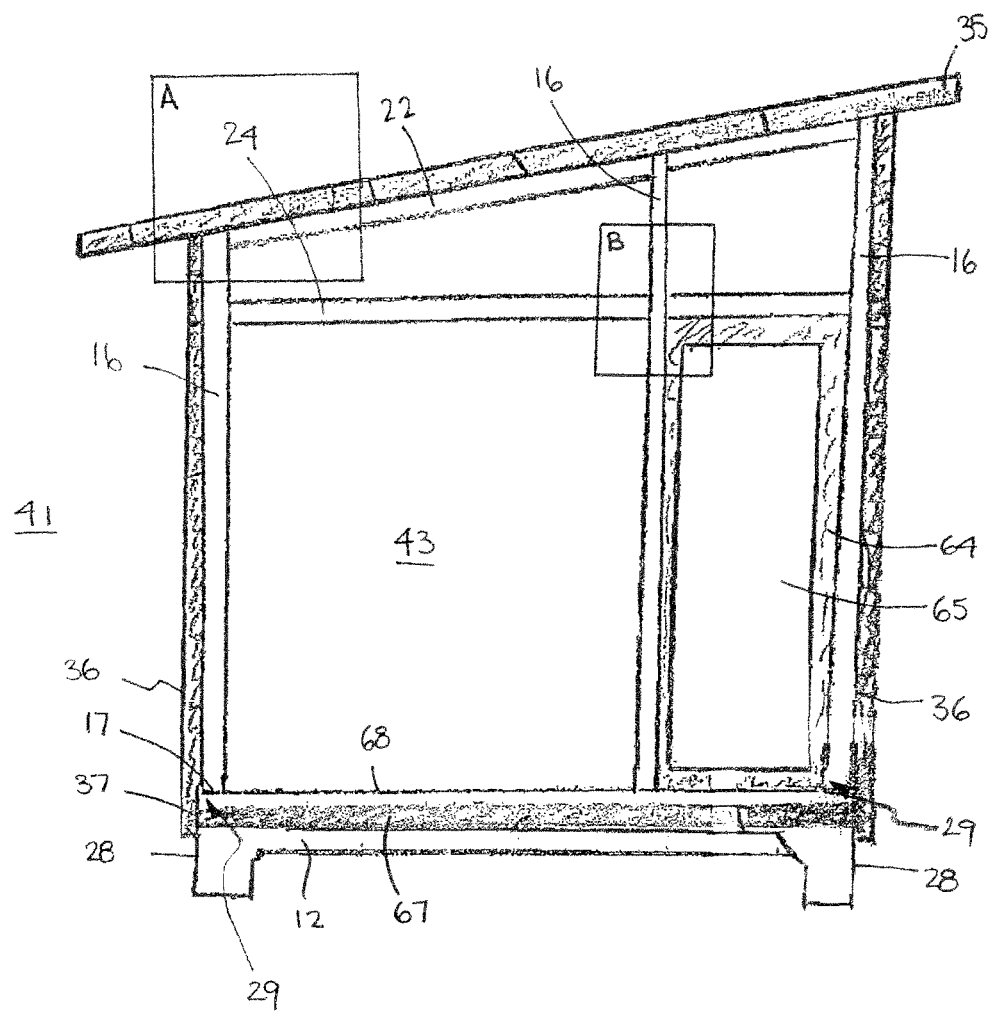
FIG. 4 is a cross-sectional side view through a building.
Figure 5:
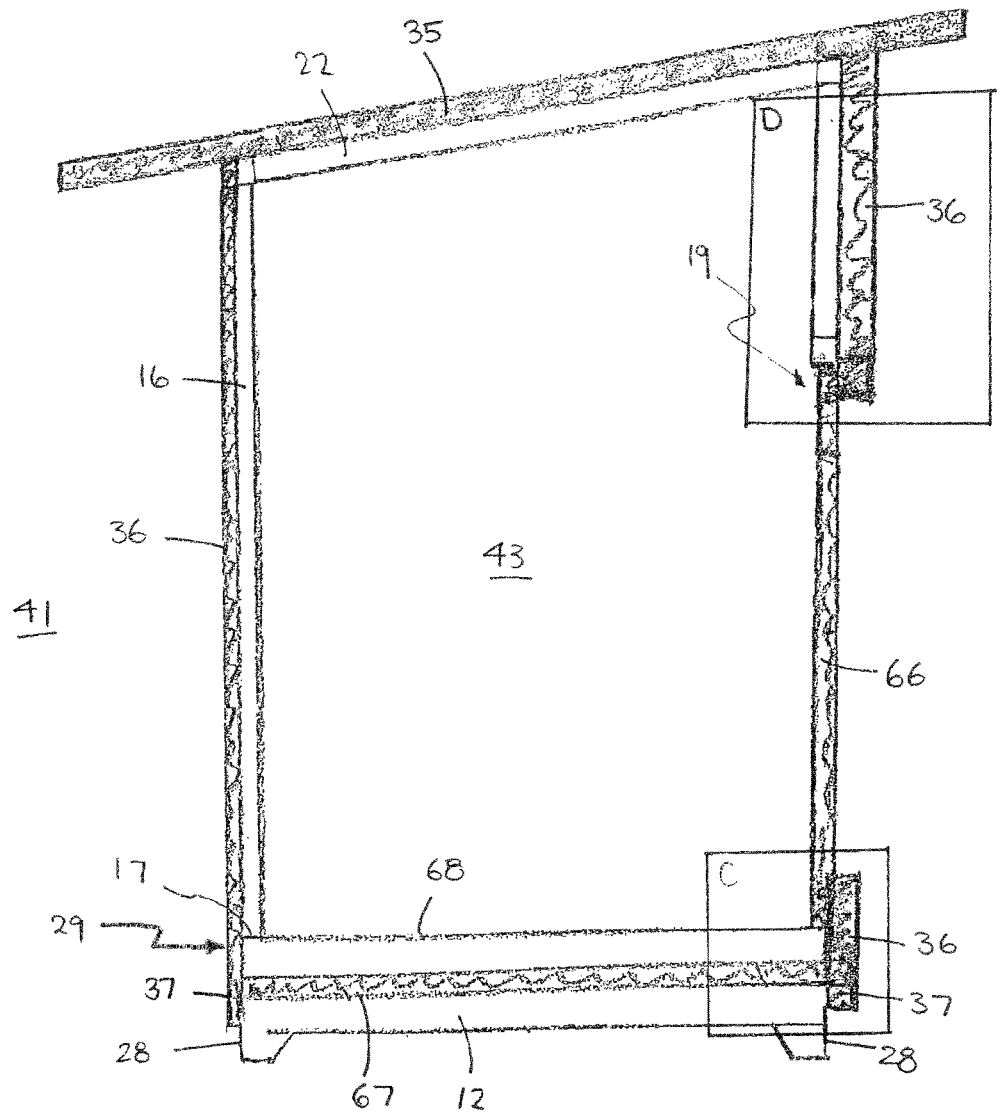
FIG. 5 is another cross-sectional side view through a building.
Figure 8A:
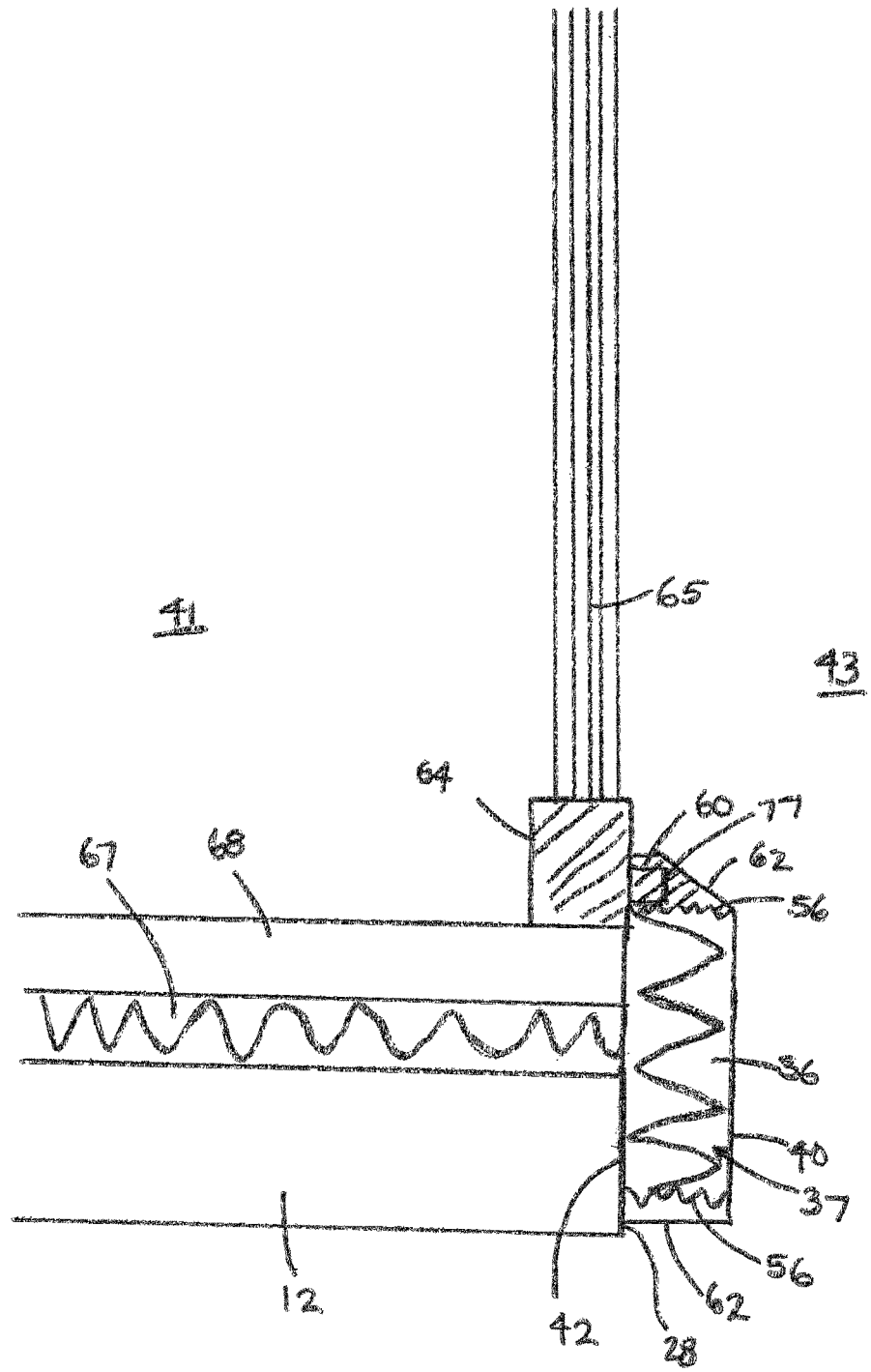
FIG. 8A is a cross-sectional side view of the side of the window of box C in FIG. 5.

The frame 18 is externally clad with insulated sandwich panels 36. The panels 36 cover the external surfaces of the frame 18 creating a building envelope. The panels 36 extend downwards further than the footings 17 of the supporting posts 16, past the junctions 29. As shown in FIGS. 4, 5, and 8A, the bottom portion 37 of the panels 36 extends down past the insulation 67 under the floor 68, connected to the slab 12 and covers part or all of the exposed portion of the slab 12. The building envelope is sealed with the floor 68 or foundation slab 12, shown in FIG. 8B, with an insulating foam tape 78 around the perimeter of the flooring 68 or foundation slab 12 where the wall panels 36 meet the flooring 68 or slab 12.

Figure 8B:
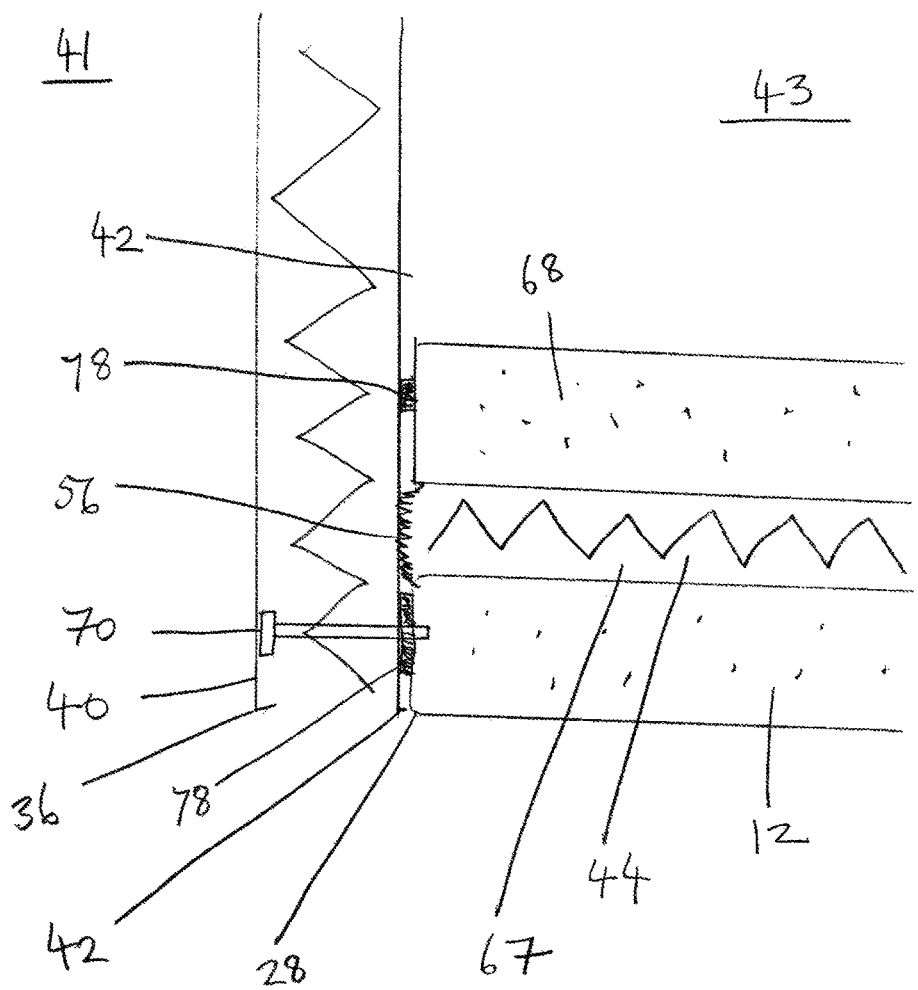
FIG. 8B is a cross-section view of a joint between a wall panel and a slab, including the application of insulating foam tape.

Insulated sandwich panels 36 form part of the walls and are attached at their base to a concrete slab edge 28 or flooring 68. The flooring 68 could further comprise a second slab or other flooring material. At this connection point insulating foam tape 78 is applied so as to fill a gap between the sandwich panels 36 and the slab edge 28 or flooring 68 and provide an airtight and vapour proof barrier that is flexible to accommodate movement in the sandwich panels 36. This is also shown in FIG. 8B.

Figure 3:
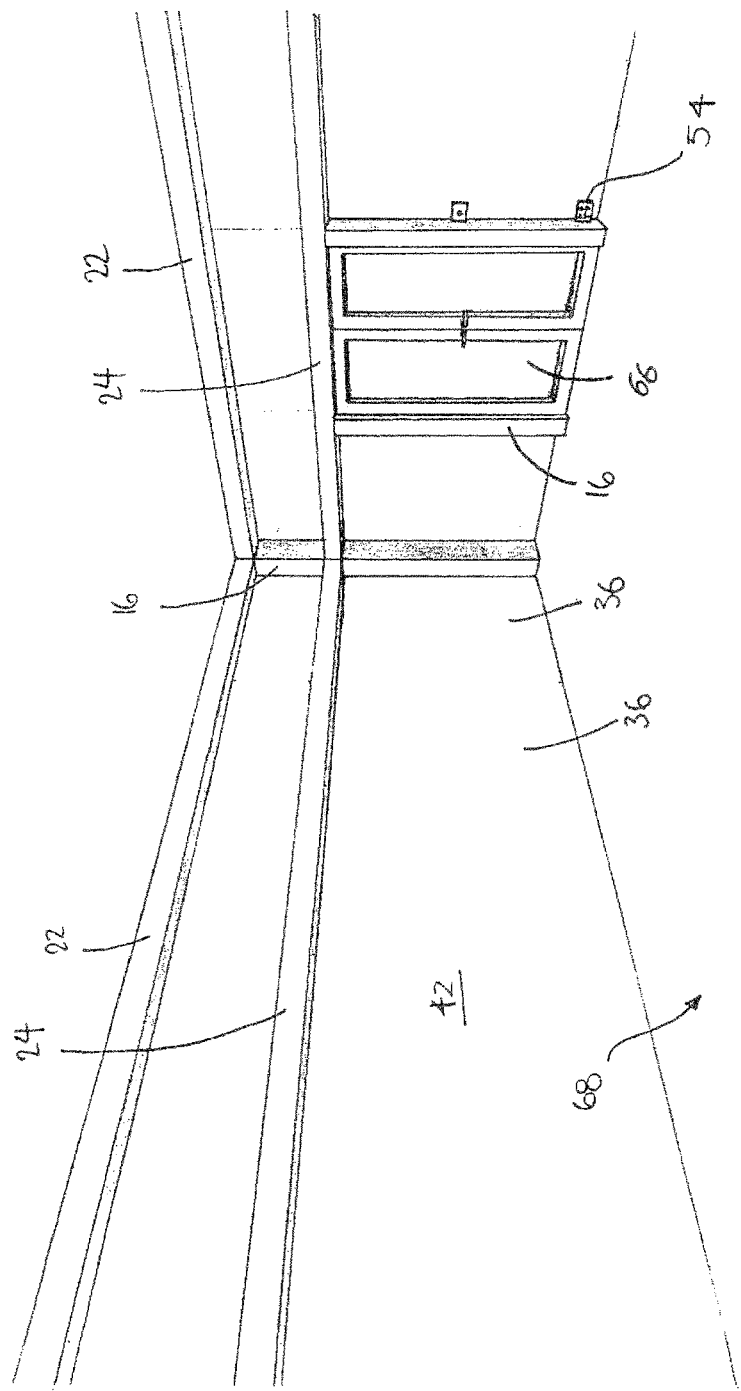
FIG. 3 is an internal view of a corner of a building constructed.

The frame 18 is prefinished, such that, as shown in FIG. 3, it can remain exposed in the interior of the building 10. The frame 18 is made from steel hollow section, and is pre-welded, with holes 52 pre-cut, and pre-painted in the factory, or painted on site before installation of the panels 36. Alternatively, the frame can be made from timber. The insulated panels 36 are internally and externally prefinished, such that additional finishing or cladding is not required for a finished building 10, but may be done so at the user's discretion. The external surface 40 of the panels 36 is typically coated steel, and may be coated with paint, enamel, a zinc/aluminium alloy, or other waterproof finish; and the internal surface 42 is preferably also coated steel, which may also be pre-painted or otherwise finished. The external and internal surfaces 40, 42 are separated by a layer of insulation 44, which in the case of the sandwich panel is typically, a rigid thermoset plastic foam, such as a closed cell polyisocyanurate (PIR). The thickness of the insulation 44 is between 50 to 100 mm, but could be thicker depending on the required performance of the insulation and the climate of the building location.

Any frame 18 must, assuming the possibility of a conductive material such as steel, be completely internal, as this retains the continuous external insulation layer, avoiding thermal bridging, and improving the thermal performance of the building envelope. Also, avoiding or minimising thermal bridging in this way enables the construction of a more energy efficient building which may comply with the Passive House Standard so that the thermal performance of the building can be estimated and measured so as to minimise or eradicate traditional heating and cooling systems.

Insulated sandwich panels 35, 36 are used to construct a completely finished wall and roof without an extra layer being required internally (or, in the case of an externally prefinished panel, externally), although extra layers may be added internally or externally as an option, without the more unwieldy, complex and costly traditional panel wiring systems.

The frame 18 makes allowances for services, such as wiring 46 (i.e. electrical conduit, wires, cabling for electrical or internet or computer or fax or satellite TV or phone connections) to be laid and concealed. Wiring 46 for the building 10 passes through or adjacent the internal frame 18 members without interfering with the insulation 44 in the panels 36. The beams 22, 24 allow wiring 46 to either run internally through a channel 48 (see FIG. 12) or to sit on top of the beams 22, 24 (see FIGS. 11, 13 and 15). Reference numerals a, b, d, e, f illustrate where holes 52 are provided in the beams and supporting posts. For aesthetic reasons, wiring 46 is laid on top of the beams when the beams are above a certain height, to reduce the visibility of the wires. The wiring 46 can be housed within a conduit or channel (not shown) to bundle the wiring 46 together. The internal frame 18 hides and allows for continuous wiring 46 to be laid around the perimeter of the room or pod.

At least the supporting posts 16 include a vertical channel 50, and are hollow cross-sectional posts, such that the wiring 46 runs internally of the posts 16. Wiring 46 is extracted from holes 52 or, if the posts and beams are not hollow, through channels which are pre-cut where possible, at suitable, potentially regular, locations for connection to power points and switches 54, computer connections, lights etc. Holes 52 are provided in the underside of the beams 24 (see FIG. 13) such that lighting 74. 75 can be installed on the underside of the beams 24, or in the joining beams 34.

It is possible for the wiring 46 to be fed through holes in the floor (whether slab or framed floor), including where the supporting posts 16 are hollow, so as to avoid disturbing the main insulated panel walls 36. Where the supporting posts 16 are not hollow the wiring can be laid through a vertical channel (not shown) which is either cut into the post or created through a fascia piece attached to the supporting post.

It is also possible for the wiring 46 to be fed into the building 10 through entry points contained within the external surface of the building envelope, for example the corners of the building, or around window frames, without disturbing the main insulated panel walls 36. The building provides for the insulated panels 36 to stop short of the corners and stop short of window frame connections, so the insulated panels 36 can be laid quickly and the corners left exposed while the wiring 46 is laid up behind the corner supporting post 16, (see FIGS. 7 and 9A) with the wiring 46 to be fed through holes or channels in the supporting posts 16 or otherwise into the interior 43 of the building 10. This also allows for easy retrofitting or alteration later without the insulated panel walls 36 being disturbed. Flashing 62 is then applied to cover the wiring 46 and spaces between panels 36 and any entry points.

Fasteners 70 are shown in FIGS. 6A, 6B 7, 9A, 9B 10A, 10B, 16, 17, 18A and 18B. The head of the fastener 70 is not exposed to the exterior of the building 41 but is covered so as to provide a thermal break (not shown). FIGS. 9 A and 9B show a corner where panel ends 56 are aligned along respective walls of the supporting post 16, such that fasteners 70 secure the panels 36 to the post 16. The corner is then covered with an insulating infill material 60 to avoid thermal bridging. The infill material 60 is a hard PIR foam or canister foam or a combination of these. A flashing 62 is then placed over the infill 60 to waterproof and finish the corner. Wiring 46 can be laid along the outside of post 16 and inserted into the frame 18 through an opening or hole 52, with the hole 52 being sealed, as discussed above. The flashing 62 and infill material 60 are removable to allow for additional wiring to be installed, with the infill 60 replaced and the flashing 62 reinstalled thereafter.

FIGS. 1, 6B, 9B, 10B and 18B show airtight and vapour proof joints by use of insulating foam tape 78 which remain airtight and vapour proof when the building components expand and contract because its composition is flexible. In the case of the flooring 68 or slab 12, insulating foam tape 78 also provides a waterproof barrier.

The wiring 46 requires relatively little preplanning. Wiring 46 is laid once the frame 18 and panels 36 are in place, by the electrician. This is more time efficient than laying wiring 46 as the panels 36 are being installed, as is required when the wiring 46 runs through or into the panels 36.

An expressed or exposed internal frame 18, hollow or with channels cut, and pre-cut holes, together with prefinished sandwich panels 36 for walls and roof, makes the construction for much of the building 10 simple and accessible for relatively unskilled labour, minimises skilled and other labour and the use of trades and materials, and saves time.

Thus the internal frame 18 is pre-designed and prefabricated to reduce or remove the need for any extra effort to accommodate wiring 46. Wiring 46 is placed throughout or behind or on top of the frame 18 and extracted for whatever use the builder/owner desires, and this allows for flexible amendment, alteration and addition easily at any time.

Further, providing for wiring 46 inside a strong frame 18 or above head height on structural beams 34 supports ongoing affordability in terms of maintenance, because the wiring 46 is protected. As the wiring 46 is laid at the corners and window edges, without disturbing the panels 36, then ongoing maintenance, repair or renovation is also easy without damaging or removing the panels 36. This contrasts with the method of wiring behind a plaster wall because deterioration or destruction of the plaster exposes the wiring and leads to damage, safety and maintenance issues. This is particularly an issue in remote terrain and harsh climates. In addition, retrofitting wiring behind a plaster wall requires the costly addition of a plasterer and painter to repair the wall. And it contrasts with the use of pre-laying wiring within a structural panel system, which cannot be altered easily or at all without removing or damaging the panels.

This means a building comprising such a high performing building envelope, can be built very quickly and potentially affordably—not just as a shell but as a complete building. At the same time the building allows for unlimited variation in terms of layers internally or externally for the building. If plaster and paint or other traditional or unusual finishes are desired, they can be added at any time.

Figure 6A:
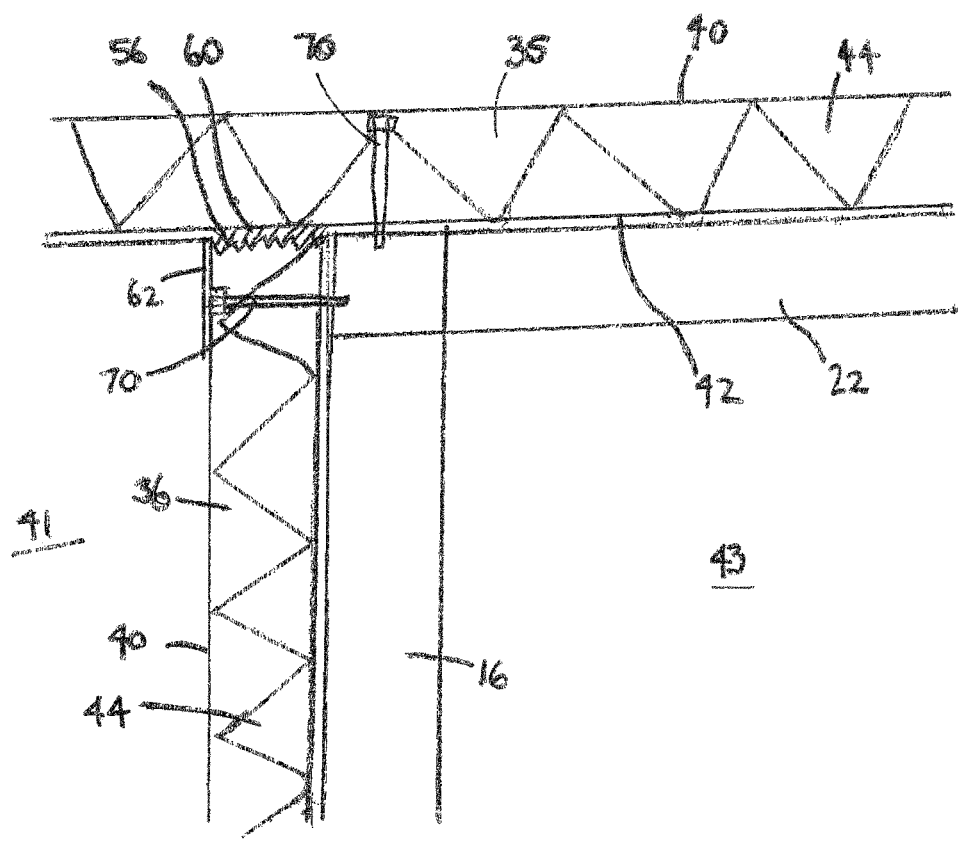
FIGS. 6A and 6B are cross-sectional side views of a wall and roof joint of box A in FIG. 4, where FIG. 6B includes the application of insulating foam tape.
Figure 6B:
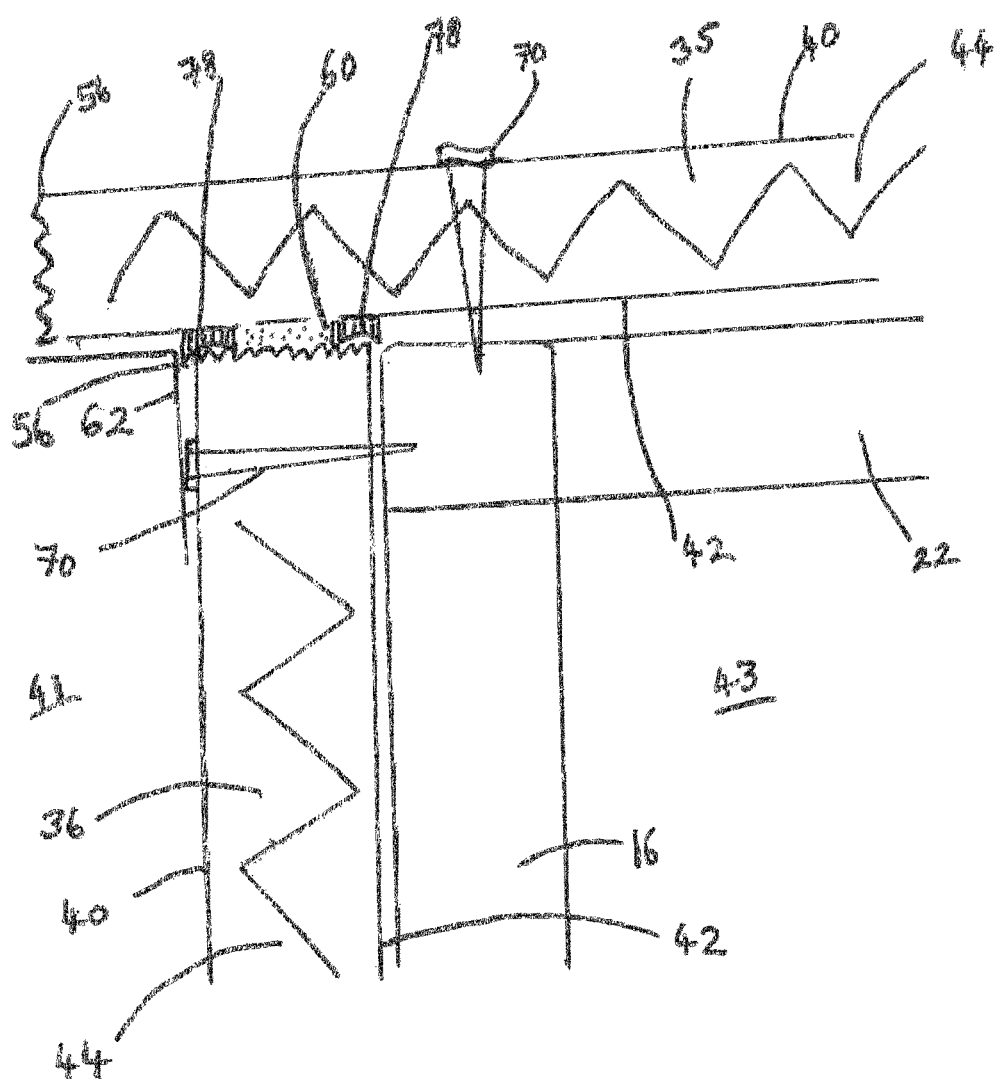

The roof is constructed from insulated panels 35, as shown in FIGS. 6A and 6B. Panels 35 sit atop the frame 18, supported by beams 22 and joining beams 34, with infill 60 sealing any gaps and a flashing 62 providing waterproofing and finishing. The application of insulating expanding foam tape 78 creates an airtight and vapour proof barrier.

At the joint between the insulated roof panels 35 and the insulated wall panels 36 insulating foam tape 78 is applied so as to fill the gap between the sandwich panel edges of the roof panels 35 and the sandwich panel ends 56. The insulating and expanding foam tape 78 is applied all the way across the top of the sandwich panel wall ends 56 or at one edge or at both edges, to provide airtightness and a vapour proof barrier.

Additional insulation material, such as solid insulation blocks, can also be provided at the joints between the steel posts and the foundations or subfloor structure.

The internal frame 18 incorporates three aspects: structural, wind loading and non-structural support. The supporting posts 16 are suitable for supporting windows and doors and providing sufficient wind loading.

Windows 64, 65 and doors 66 are located on top of the slab 12 and sit between supporting posts 16, aligned with the edge 28 of the slab 12 and associated flooring 68, as shown in FIG. 8A. The windows 64, 65 are set back from the external surface of the building. The panels 36 are laid outside the slab edge 28 externally offset from the frame 18, windows 64 and doors 66, to facilitate multi-level buildings with continuous insulation and a continuous finished exterior surface 40 on the outside of the building 10.

The window frames 64 are made of insulating material or thermally broken designs. The window glazing 65 is double or triple glazed with specifications of glass and gaps between glass panes so as to provide high performing insulation (or low "U" values), and to avoid any thermal bridging through the windows 64, 65. As with the corners of the building 10, at the window openings the panel ends 56 of the panels 36 are secured to the supporting posts 16 with fasteners 70 which are in turn covered so as to provide a thermal break (not shown). Insulation infill 60 is then provided by hard PIR foam with canister foam as needed, extending between the ends 56 of the panels 36 and the window frame 64, providing a sealing arrangement making a substantially airtight junction between each door/window 64, 65, 66 and opening 19. This fully encloses the internal frame 18 avoiding any thermal bridging. A flashing 62 is positioned over the infill 60 to waterproof and finish the connection.

At the base of the window 64 (see FIG. 8A), additional infill 60 and a flashing 62 is provided that extends from the window frame 64 to the panel 36 underlying the window 64 adjacent to the slab edge 28. It can be seen from FIGS. 8A, 10A and 10B that a full length window 64, 65 extends from the floor 68 up to a beam 24. Panels 36 are placed below and above the window 64, 65 continuing the building envelope.

As shown in FIGS. 7, 8A, 10A, 10B, 16 and 18A, the windows 64, 65 are provided in alignment with the frame 18 and are offset from a plane of the building envelope, which is formed from the panels 36. Such a configuration is usually avoided as it is considered to be non-compliant by the Passive House Institute who typically stipulates that the plane of the insulation of the external walls should be aligned with windows as far as possible. However, as exemplified in the preferred embodiments of FIGS. 7, 8A, 10A, 10B, 16 and 18A, staggering or offsetting the windows away from the building envelope, has been found, upon testing, to be a configuration that is compliant with the International Passive House Standard.

External roller shutters, casement shutters or blinds 72 (see FIG. 1), and/or fixed overhangs or other sunshading (not shown) provide shading in hot weather, and may be an essential part of Passive House compliance for some walls in some climates, can be fixed to the window frame 64 or the exterior surface 40 of the panels 36 or attached by an external frame which is separately constructed and not connected to the interior 90 of the building (not shown).

Figure 7:
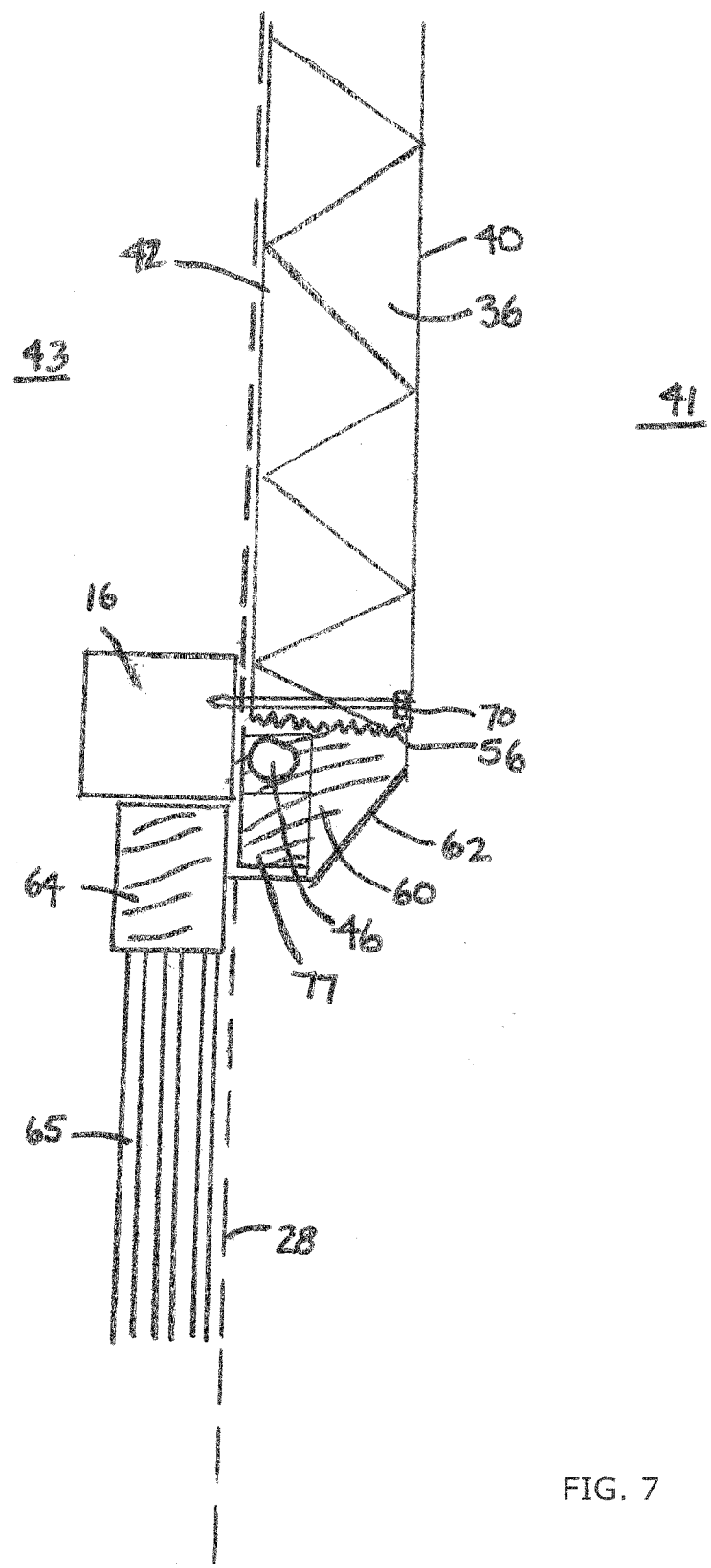
FIG. 7 is a cross-sectional view of the side of the window of box B in FIG. 4.
Figure 10A:
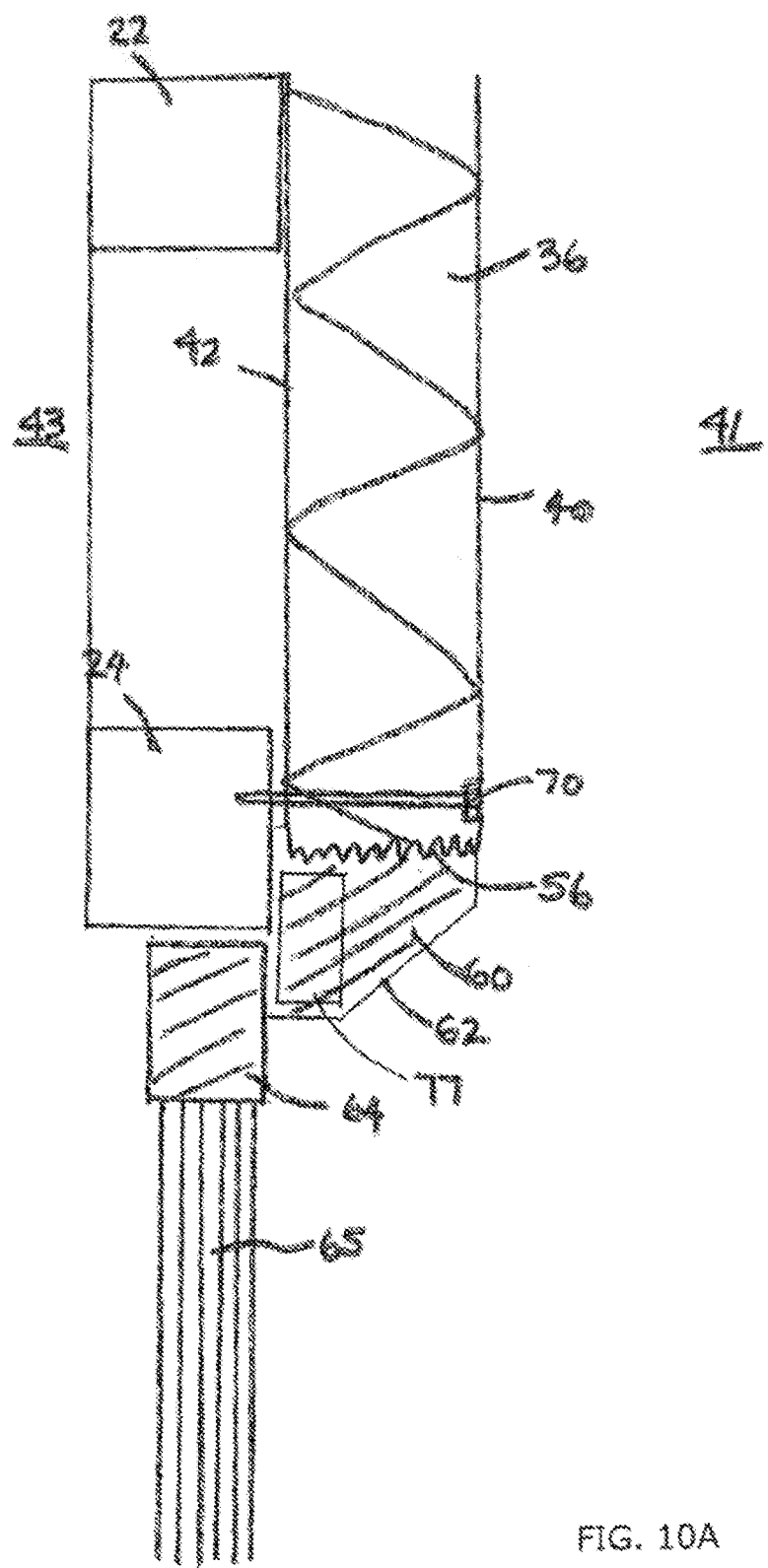
FIG. 10A is a cross-sectional side view of the top of a window of box D in FIG. 5.

Solid insulating material 77 is attached to window frames or the structural frame so as to provide structural support for sunshading devices or other external framing while minimising or avoiding thermal bridges (see FIGS. 7, 8A and 10A).

In contrast to "passive solar" designs favourable in Australia, (where large windows are to face north as far as possible), this building follows principles of the Passive House Institute which is not as dependent upon orientation to the sun. Nor is it dependent on thermal mass (usually provided in a concrete slab) for natural heat gains through use of the sun's rays. Again, this makes the building more accessible to more people as their land blocks may not be naturally suited to a northerly orientation (e.g. views, neighbouring houses, may dictate windows facing in another direction). Importantly, this building allows for optimum thermal building performance and can comply with the Passive House Standard, a measurable and internationally leading performance standard, if desired.

Also, ongoing maintenance of wiring and protection of electrical and data cables, as well as accessibility in the case of alterations and fixing of wiring during the life of the building, must also be considered to ensure affordability in the ongoing life of the building. That is, where wiring is embedded in sandwich panels, ongoing maintenance will be difficult and costly.

The insulation of corners and window edges contains continuous insulation of a minimum thickness and R value, and is applied to as to minimise or avoid thermal bridging, as would be expected for compliance under the International Passive House standard. Insulation of corners and window and door connections is achieved by abutting panels 36 to each other (see FIG. 17), continuing panels past structural frame elements, window or door frame elements, (see FIGS. 16, 18A and 18B), or fixing panels 36 at or next to their prefabricated edges 56 to the structural frame 18 and filling the remainder of the insulating envelope with insulating foam 60 and/or structural insulating pieces before flashing 62 is installed (see FIGS. 7, 9 A, 9B, 10A and 10B).

Sealing the building 10 to make it virtually airtight and vapour proof, together with a mechanical ventilation unit as part of this building 10, together with an airtight building envelope, also affords compliance with energy efficiency standards such as the Passive House Standard. This gives consumers access to a repeatable building 10 that is pre-designed to meet high thermal insulation standards.

The building 10 can comprise the building of a 'pod' of a standard size and shape so that engineering and design is simplified. This way people can purchase a design for one pod or a 6 or 10 pod house without requiring extensive redesign or engineering. The pods are separated by corridors which give a buffer zone. See FIG. 14.

The building 10, being partially pre-designed as described above, can be applied or adapted for a range of buildings, thus saving design time and cost. The building 10 can be a multi-level building, particularly by the use of the frame, panel, door, window and wiring as described herein.

The building 10 is adaptable and applicable to smaller residential buildings, typically single dwellings or buildings for more than one group of occupants (dual occupancy), and typically up to three levels high.

The building 10 is able to be applied to housing for groups or families who cannot afford expensive housing, or to accommodation for elderly or ill people, who would particularly benefit from efficient, low energy housing with comfortable temperatures and fresh air.

Design and construction cost is reduced by the repetition of a pre-designed structural frame. The 'pod' building allows for easy addition after construction of the initial building. It allows for different zones for flexible family and community living arrangements. The potential for corridors 32 with the addition of walls using sandwich panels 36 or other wall systems between the frames 18 of the pods 30 improves acoustic buffering. See FIG. 14.

To assist in fitting out, at least one of the internal beams 24 is set at 2.4 m from floor level. This allows for the potential to include lining panels (e.g. plywood, plaster, other), which often come at lengths of 2.4 m, or wallpaper, curtain rails, picture rails, hanging cupboards/shelves; at the homeowner's discretion and according to their budget.

Another addition to the building 10 is the option to have internal "pods" within the internal frame 18 with an internal separate ceiling at around 2.4 m high. This allows for services to be run or laid or positioned in the gap between the 2.4 m pod ceiling and the ceiling of the building, which typically sits on an angle between approximately 2.8 and 3.3 m high in some embodiments.

The lights and lighting systems 73, 74, 75 are installed by attaching the lights to the frame 18 or to arms 76 attached to the frame 18 whether fixed or movable or to cables hanging from the frame 18 or holes 52 in the frame 18. The lighting includes connectable tube lighting 73, fixed lights 74 and pendant or hanging lights 75, with cables or wiring hanging from fixed or movable arms 76 or holes 52 in the frame 18 (see FIG. 15).

The airtight and vapour proof barrier is provided for the building through junctions and connections in or near the insulation layer 44. The insulating foam tape 78 is applied in various joints including the joint between wall and roof on either the top of the internal surface of the wall panels 42 or the external surface of the wall panels 40 or both and within the insulation layer 44, as shown in FIG. 3.

Figure 9A:
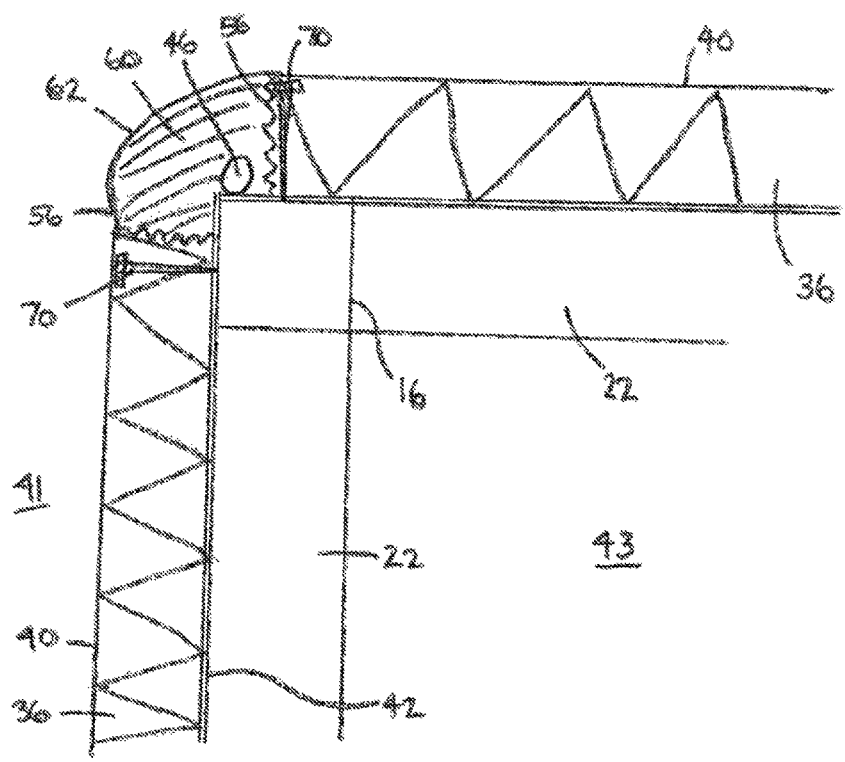
FIGS. 9A and 9B are cross-sectional top views of the corner of a building, where FIG. 9B includes the application of insulating foam tape.
Figure 9B:
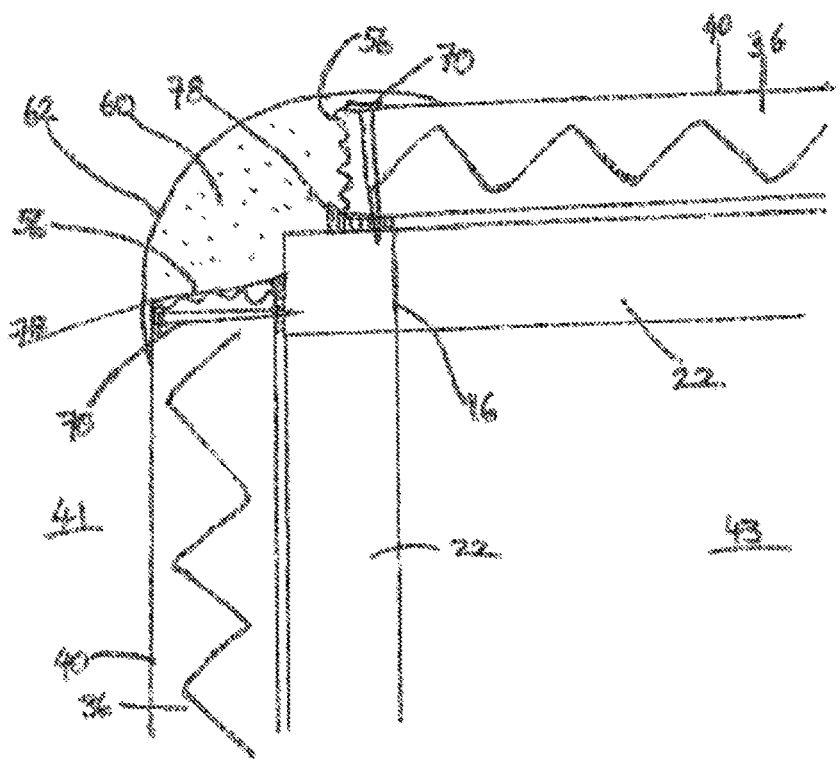

Between sandwich panels 36 on the internal surface of the wall panels 42 where they join with the supporting post 16 in the frame 18, insulating foam tape 78 is applied to provide an airtightness and a vapour proof barrier as shown in FIG. 9B.

Figure 10B:
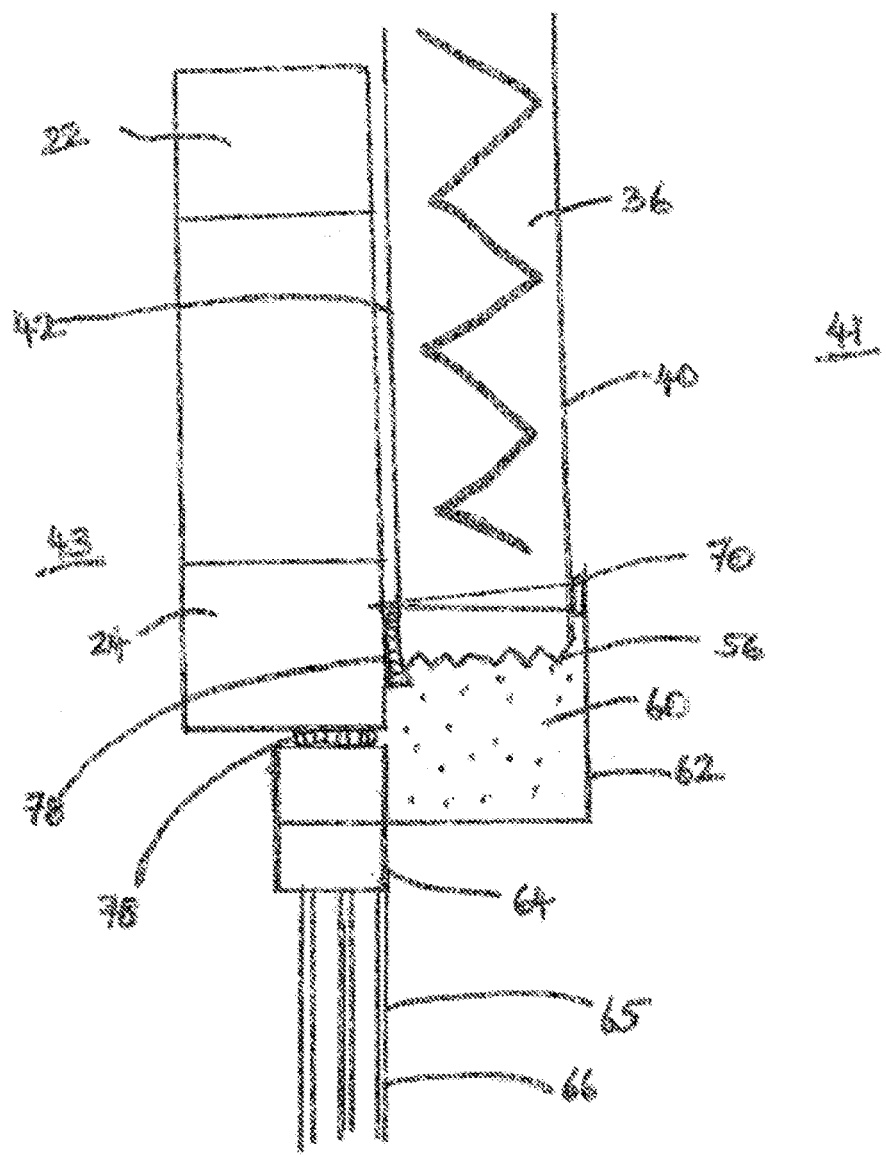
FIG. 10B is a cross-sectional view of the connection between a panel, beams and window.
Figure 18A:
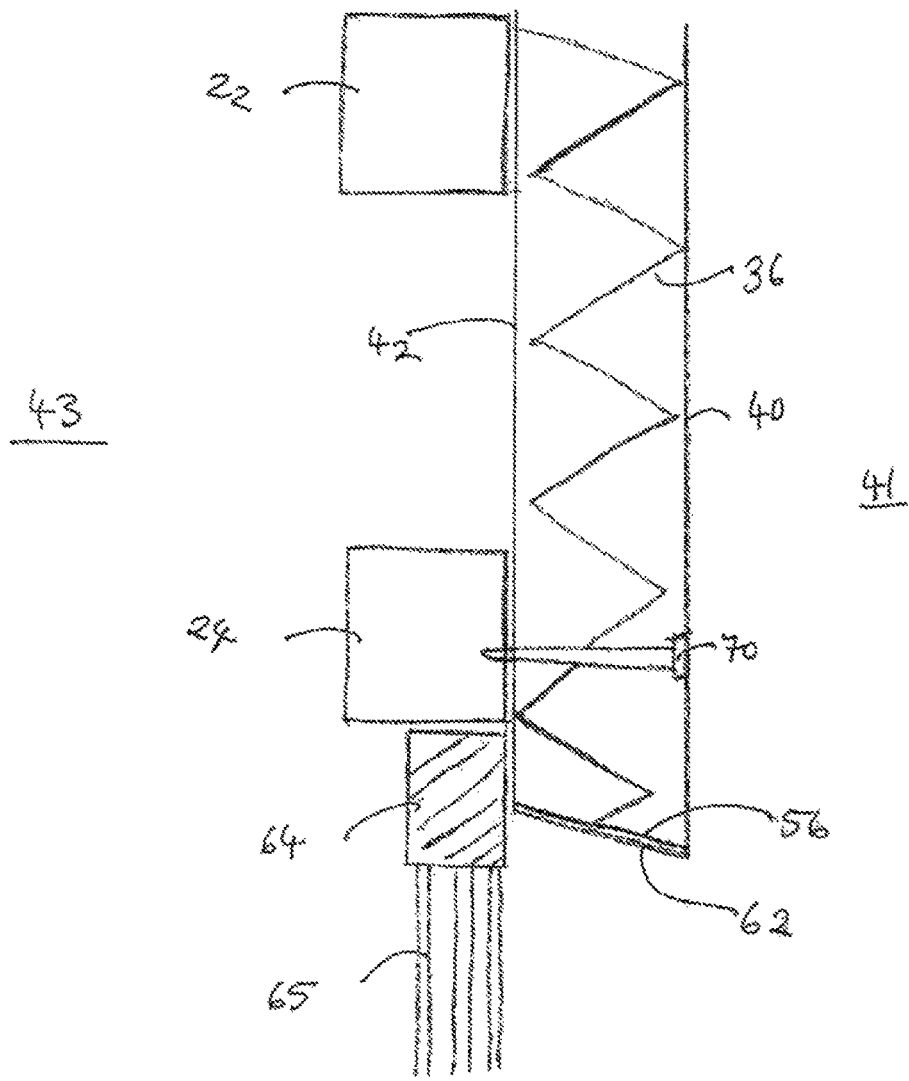
FIG. 18A shows a cross-sectional side view of the top of a window according to another embodiment of the present invention.
Figure 18B:
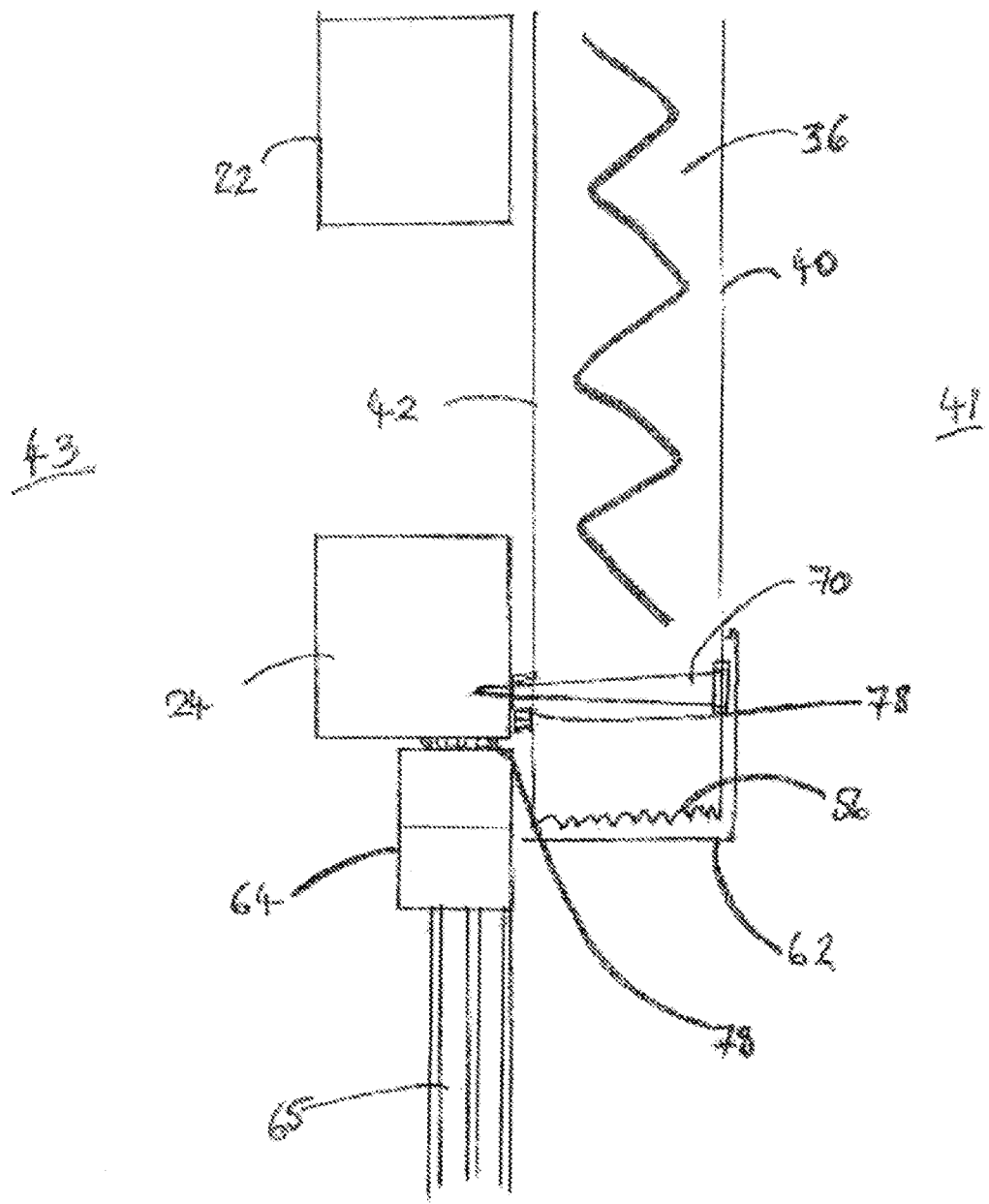
FIG. 18B shows a cross-sectional view side view of the top of a window according to another embodiment of the present invention.

Between sandwich panels 36 on the internal surface of the wall panels 42 where they join with frame 18 whether a supporting post 16 or beam 24 and an opening in the panel facade is required for a door or window to be attached to the supporting post 16 or beam 24, insulating foam tape 78 is applied between the sandwich panels 36 and the frame 18, post 16 or beam 24 to provide airtightness and a vapour proof barrier as shown in FIGS. 10B and 18B.

Where a window or door is connected to part of the frame 18 whether a supporting post 16 or beam 24, insulating foam tape 78 is applied between the window or door and the frame 18 as shown in FIGS. 10B and 18B.

Such buildings are able to be used for any occupiable building. It can be stacked into multilevel apartments or used for supported accommodation or large spaces, whereby the shape of the frame and/or pod may change, but the window connection details and all other features would still be effective.

By the use of these elements a passive house or building may be designed and constructed for a particular site: panels, frame members, windows and doors, connection details, continuous insulation, avoidance or minimisation of thermal bridging, airtightness, and an air ventilation unit. The characteristics or properties of these elements, and the collection of elements into the building system, are able to be pre-assessed by use of the PHPP or other building physics spreadsheet or program, to provide a base model for fast construction of a passive house building envelope. Using such spreadsheet or program, the unique characteristics of a particular planned building, including site, orientation, climate, context, size, and shape of building, the building's energy use may be predicted and the design may be optimised and adapted to minimise its energy use after construction.

The design, with pre-assessed components and connection details, pre-assessed for thermal insulation performance, can be adapted and varied in its detail while retaining the elements of each material and varying specifications in those materials without changing connection methods and without requiring internal plaster or other layers or linings. Variations may include depth of panels, glazing configurations, and position and size of windows. The adaptation and variation may be achieved by the use of the PHPP employed by a passive house designer or consultant, or other building physics spreadsheet or program devised to predict or model a building's energy use performance. Such spreadsheet or program will calculate the impact of unique variables such as the site, climate, orientation, size and shape of the building, and facilitate adaptation of the design and construction of a building so as to optimise performance to the Passive House Standard. This design system makes the fast and high performing low energy use buildings accessible for each individual site by use of a unique engineered solution which may be quickly employed for each specific building.

Also, ongoing maintenance of wiring and protection of electrical and data cables, as well as accessibility in the case of alterations and fixing of wiring during the life of the building, must also be considered to ensure affordability in the ongoing life of the house. That is, where wiring is embedded in sandwich panels, ongoing maintenance will be difficult and costly.

Figure 19:
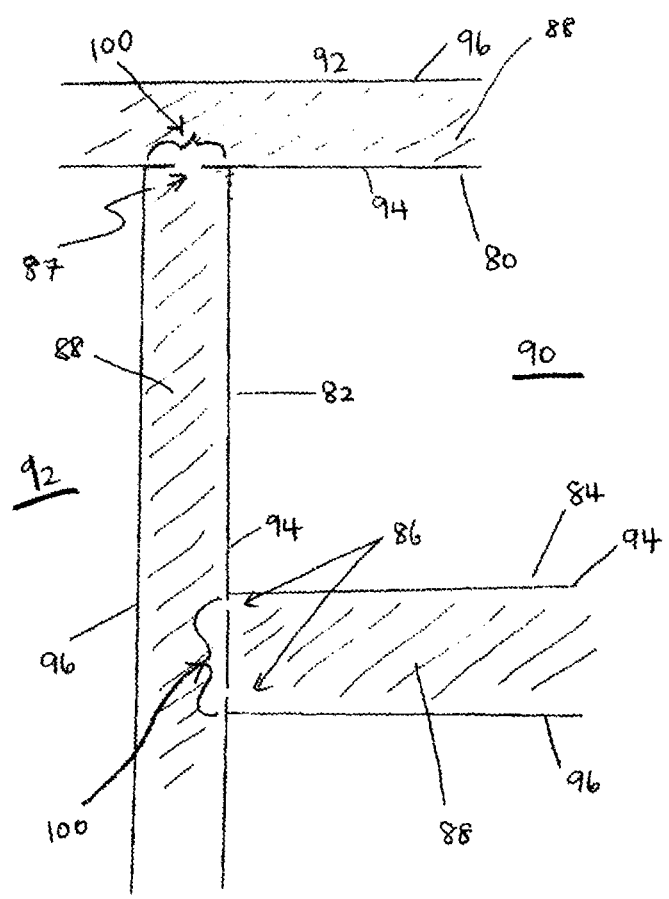
FIG. 19 is a cross sectional side view of joints between insulating sandwich panels in a wall and roof joint and a wall and floor joint, showing channel(s) in the wall panels to prevent thermal bridging.
Figure 20:
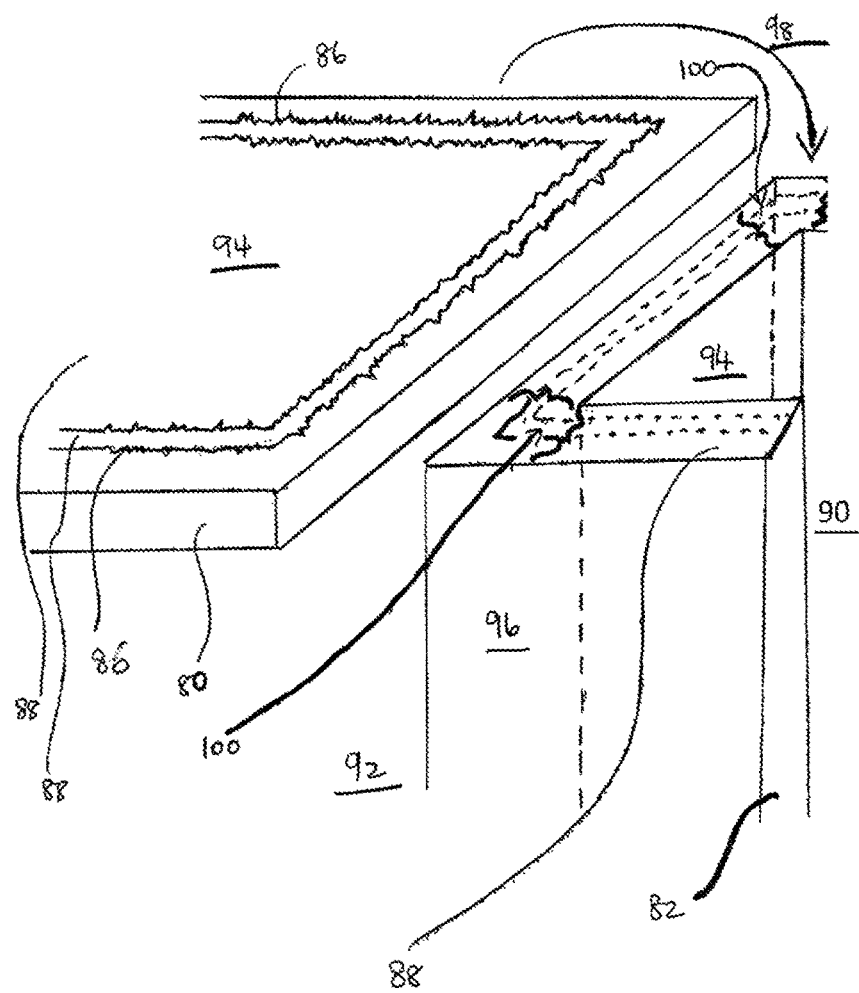
FIG. 20 is an exploded view of where roof panels meet wall panels, showing channels in the roof panels to prevent thermal bridging.
Figure 21:
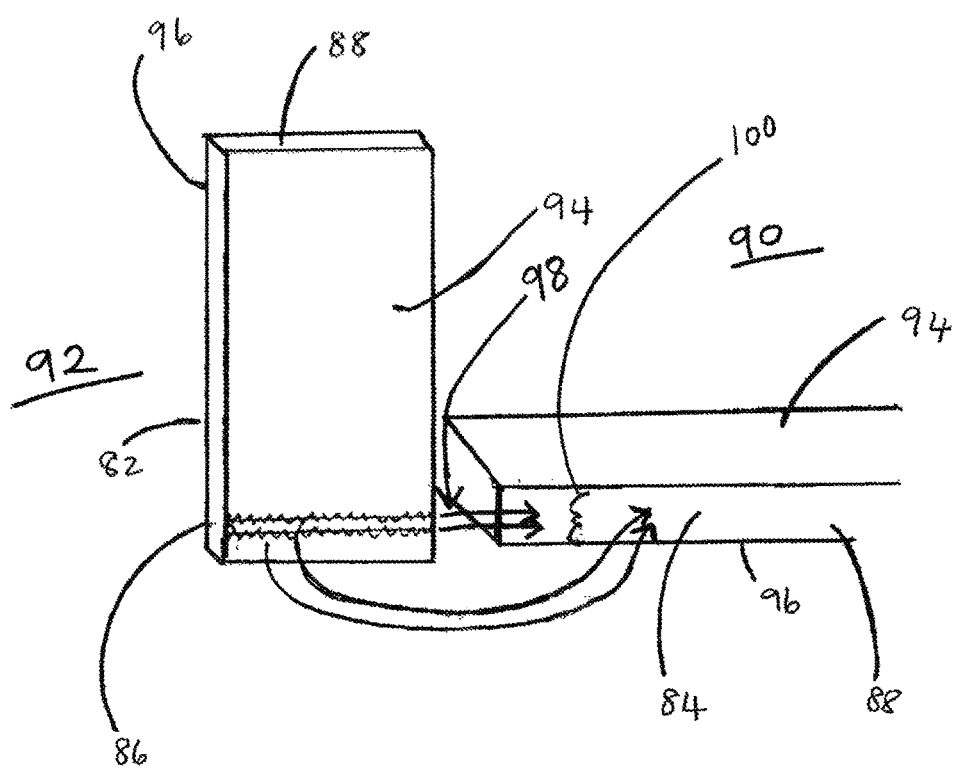
FIG. 21 is an exploded view of where wall panels meet floor panels, showing channels in the wall panels to prevent thermal bridging.

Referring now to FIGS. 19 to 21, there are shown joints between roof and wall panels 80, 82 and wall and floor panels 80, 84 and where a surface 94 of the panels 80, 82, 84 is made of metal. FIGS. 19 to 21 show a portion of the sandwich panel interior surface 94 provided with two channels 86. Each channel 86 can be comparatively narrow, in the order of 2 mm wide, but can be of a width, for example between 1 mm to 5 mm wide.

The channels 86 are generally parallel and adjacent to each other, with typical spacing between the channels 86 being in the range of 2 to 46 mm, for a panel with a thickness of 50 mm (with proportional spacing between channels for panels of varying thicknesses, for example, 80 mm or 150 mm). In general, the spacing between the channels 86 is dependent on the thickness of the insulating layer 88 of the adjoining panel, and therefore the spacing is such that the total width of the channels 86 and the spacing therebetween do not exceed the thickness of insulation layer of the adjoining panel and where the channels 86 are encompassed by the insulation layers 88 of both panels. For example, in FIG. 19, the total width of the channels 86 of wall panel 82 is less than the width of the insulating layer 88 of floor panel 84, and the channels 86 are sandwiched within the insulation layer 88 of wall panel 82 and floor panel 84. However, it is possible, if the channel or channels 86, 87 of the panel do not align with the insulating layer of the adjoining component or panel, that the channel(s) could be exterior but adjacent to the wall/floor or wall/roof joint. In such a case, by arranging additional insulation over the exposed channel or channels of the panel, the channel(s) can still form a thermal break FIG. 19 also shows a portion of the sandwich panel 80 with an interior surface 94 provided with a single channel 87, which is 10 mm wide, but can be, for example, between 5 to 12 mm wide, for a sandwich panel 80. The single channel 87 is not limited to being applied to a roof panel 80, but can be applied to the wall panel 82 of FIGS. 19 and 21.

Ordinarily, that portion of the surface 94, excluding the channels 86 or channel 87, connects the interior of the building 90 to the exterior of the building 92 with a continuous section of metal, thereby forming a thermal bridge where heat can enter or exit the building. The channel(s) 86, 87 break the thermal conduction in that portion of the surface 94 in a direction generally transverse to the channel(s) 86, 87 reducing or arresting any exchange of heat between the interior 90 and exterior 94 of the building.

In one significant system for designing energy efficient buildings, the "Passive House Standard" promulgated by the International Passive House Institute based in Darmstadt Germany, a thermal bridge can be calculated and given a value based on the "rate of heat flow per degree temperature difference per unit length of the thermal bridge" (www.leedsmet.ac.uk). It is described as "watts per square meter of surface area for a temperature gradient of one Kelvin per meter thickness", or W/mK. A thermal bridge value of 0.01 W/mK is regarded as negligible for the purposes of calculating the energy efficiency of the building. If this is not possible, then the lower the number the better.

A standard steel faced sandwich panel can be modelled using software to calculate the thermal bridge value of a sample connection detail, and such a connection detail can produce a thermal bridge value of 0.27 or higher, which is too high a value to be acceptable for Passive House Standard energy building design. Modelling a sample joint comprising a single narrow channel, in a joint between a sandwich panel and another component can reduce the thermal bridge value. However, a sample joint between a metal surface of a panel comprising two or more narrow separate channels, on the order of 2 to 4 mm, and another component of the building, produced a surprising result when modelled using thermal bridge software to reduce the calculated thermal bridge value to zero. This is an optimum result. A comparatively wide channel on the order of 5 to 12 mm is also expected to produce similar thermal conductivity reductions.

The portion of the internal surface 94 comprising the channel(s) 86, 87 is positioned to adjoin the insulation layer 88 of a panel, such as a roof, wall or floor panel 80, 82, 84. The portion of the surface 94 comprising the channel(s) 86, 87 are therefore enclosed by insulating layers 88 between perpendicular insulated sandwich panels 80, 82, 84. The position for the channel(s) 86, 87 when the perpendicular insulated panels 80, 82, 84 is bracketed 100.

In the case of a roof panel 80, the channel(s) 86, 87 are positioned on the interior surface of the panel 94 above the wall panel 82 in the insulating layer 88; with those channels 86, 87 provided, when the perpendicular panels are joined, in the position bracketed 100. When the roof panel 80 is placed over a wall panel 82, with the roof panel 80 extending past the insulating layer 88 to the exterior of the building 92, the two channels 86 or channel 87 are positioned in between the interior surface 94 of the wall panel 82 and the exterior surface 96 of the wall panel 82. This is shown in FIGS. 19 and 20.

In the case of a wall panel 82; the channels 86 are positioned on the interior surface 94 of panel 82 in the insulating layer 88 where the wall panel 82 meets the floor panel 84. That is, the two channels 86 in the wall panel 82 must be positioned lower than the upper edge of the insulating floor panel 84, and higher than the lower edge of the insulating floor panel 84, to join with the floor panel 84 in the bracketed position 100. The two channels 86 must be positioned in between the interior surface 94 of the floor panel 84 and the exterior surface 96 of the floor panel 3. Although two channels 86 are provided in the joint between floor and wall panels 82, 84, it is expected that the provision of a single channel 87 may be equally applied to that joint.

While FIGS. 19 to 21 discuss the application of providing two channels 86 or a single channel 87 in the surface of a panel to break thermal conduction in a joint between roof and wall panels 80, 82 and floor and wall panels 82, 84, providing channel(s) in a portion of a surface of a panel to break thermal conduction is equally applicable to the joints or connections between the portion of an internal surface 94 of a panel 80, 82, 84 and another component of the building, such as a window, another sandwich panel, door, or where the panel may meet a component of the building to form a corner.

Figure 22:
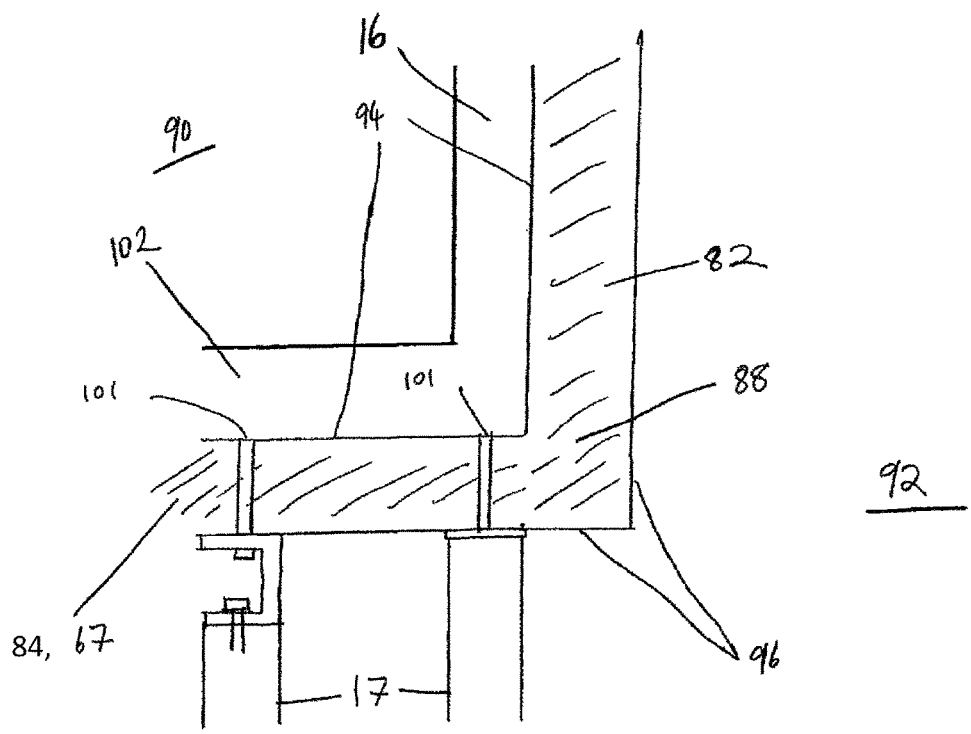
FIG. 22 shows an alternative footing arrangement according to the present invention.

An alternative footing arrangement, as shown in FIG. 22, provides for the building 10 to have a floor structure 67, 84 inside the insulation layer 88. The insulation layer 88 can be located next to and perpendicular with the insulated floor layer 67, 84 which can be placed beneath steel joists 102 in the floor. The steel joists 102 can be connected with minimal pins or bolts 101 either welded or bolted and connecting the steel joists 102 to footings 17 connected to the ground. An alternative footing arrangement (not shown) provides for the steel joists 102 to be placed below the insulated floor layer 67, 84, in which case connections between the steel joists 102 and the steel frame 18 inside the insulated building envelope will be thermally broken with insulating material, and if high compressive strength is required, Foamglas® or Tarecpir® can be attached between the steel frame 18 inside the insulated building envelope, and the joists 102 below it.

In this way the building 10 can be elevated and if appropriate could be transportable. Thermal bridges through the floor 67, 84 are minimised.

If the building 10 is transportable the extent of the steel frame 18 internally may be reduced, depending upon engineering calculations, as the building 10 may be small enough to retain structural strength by riveting the surfaces of the panels 80, 82, 84 together. This arrangement will further reduce the risk of air leakage, and reduce costs.

While various embodiments of the present invention have been described above, it should be understood that they have been presented by way of example only, and not by way of limitation. It would be apparent to a person skilled in the relevant art that various changes, modifications and improvements can be made therein without departing from the spirit and the scope of the invention. Thus, the present invention should not be limited by any of the above-described exemplary embodiments. In particular, while the preferred embodiments of the present invention discuss one or two channels provided in a portion of a panel, it should be understood that three or more channels could be provided, and their width and spacing can be varied, so as to provide a break in the thermal conduction with a low thermal bridge value, as would be understood by a person skilled in the art.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

REFERENCE NUMERALS 10 building 60 insulating infill material
12 slab 62 flashing
16 supporting post 64 window or door frames
17 footings 65 glazing
18 frame 66 doors
19 openings 67 insulation under floor
20 pre-assembled frame 68 flooring
22 beams 70 fastener
24 beams 72 blinds/shutters
28 slab edge 73 tube lighting
29 support junctions 74 fixed light
30 repeatable pods 75 pendant or hanging light
32 corridor 76 fixed or movable arms attached
34 joining beams 77 solid insulating piece
35 roof panels 78 insulating foam tape
36 insulated sandwich panels 80 roof panel
37 bottom portion of panel 82 wall panel
40 external surface of panels 84 floor panel
41 exterior of building 86 channels internal surface of panels 87 single channel interior of building 88 insulating layer insulation layer 90 interior of building wiring 92 exterior of building horizontal channel 94 interior surface of panel vertical channel 96 exterior surface of panel holes
98 arrow depicting joint roof power points and switches 100 bracket The claims defining the invention are as follows:
1. A building, comprising:
a structural frame of the building, at least one window or door supported by and substantially aligned to the structural frame, and an external wall formed from insulated sandwich panels, the insulated sandwich panels in the external wall being supported by the structural frame, the insulated sandwich panels being offset externally from the structural frame;
each insulated sandwich panel comprising two skins and a continuous insulation layer sandwiched in between the skins;
the external wall including insulating sealing means at any junction or space between the insulated sandwich panels and between the insulated sandwich panels and the at least one window or door, so that an insulation layer, formed by the continuous insulation layers and the sealing means, is continuous within the external wall and around the at least one window or door;
the structural frame is exposed in at least part of an interior of the building when the building is finished and wherein at least part of an internal wiring of the building traverses the interior of the building on and/or in the structural frame;
wherein a surface of one of the skins of at least one of the insulated sandwich panels is metal; and
wherein a portion of a metal surface of at least one of the insulated sandwich panels adjoining another insulative component of the building comprises at least one channel configured to break thermal conduction along the portion of the insulated sandwich panel in a direction transverse to the at least one channel.

2. The building according to claim 1, the external wall further comprising sealing means at a junction or space between sandwich panels or between sandwich panels and other building components, including the at least one window or door the structural frame, a floor and a roof so as to substantially reduce or eliminate a flow of air through that junction or space.

3. The building according to claim 1, wherein the structural frame is pre-finished.

4. The building according to claim 1, wherein at least one of the insulated sandwich panels is pre-finished.

5. The building according to claim 1, further comprising:
a subfloor structure for supporting the building;
the structural frame further comprising a plurality of frame members including supporting posts, beams, joists and connections to the subfloor structure including slab or stump footings;
wherein the frame is connected to the subfloor structure at one or more support junctions and the insulated sandwich panels and the sealing means are fixed externally of the frame, such that the insulated sandwich panels or the sealing means extend past the one or more support junctions such that substantially an entirety of the frame is insulated from an external environment and thermally separated from any parts of the frame or the one or more support junctions outside the insulation layer.

6. The building according to claim 1, wherein the structural frame is substantially made of metal.

7. The building according to claim 1, the portion comprising two adjacent generally parallel channels.

8. The building according to claim 1, wherein another component of the building is a further insulated sandwich panel, and the portion adjoins an insulating layer of the further insulated sandwich panel.

9. The building according to claim 1, wherein the at least one channel substantially follows a path which extends parallel to edges of the at least one insulated sandwich panel, such that an internal part of the insulated sandwich panel is thermally isolated from the edges of the panel.

10. The building according to claim 1, wherein the at least one channel is 1 mm to 12 mm wide.

11. The building according to claim 1, wherein the portion or a joint between the portion and the another component of the building comprises support material such that the portion or the joint is strengthened.

12. The building according to claim 1, wherein the interior of the building is substantially airtight and thermally isolated from an exterior.

* * * * *